United States Patent
Wood et al.

(10) Patent No.: US 11,366,203 B1
(45) Date of Patent: Jun. 21, 2022

(54) COHERENT HIGH SPEED SCANNING LIDAR

(71) Applicant: Insight Photonic Solutions, Inc., Lafayette, CO (US)

(72) Inventors: Christopher Wood, Lafayette, CO (US); Jason Ensher, Lafayette, CO (US)

(73) Assignee: INSIGHT LIDAR, INC., Lafayette, CO (US)

( * ) Notice: Subject to any disclaimer, the term of this patent is extended or adjusted under 35 U.S.C. 154(b) by 559 days.

(21) Appl. No.: 16/385,500

(22) Filed: Apr. 16, 2019

Related U.S. Application Data

(63) Continuation of application No. 16/295,649, filed on Mar. 7, 2019, now abandoned.

(60) Provisional application No. 62/640,293, filed on Mar. 8, 2018.

(51) Int. Cl.
    *G01S 7/481* (2006.01)
    *G01S 7/48* (2006.01)
    *G01S 17/34* (2020.01)

(52) U.S. Cl.
    CPC .......... *G01S 7/4817* (2013.01); *G01S 7/4808* (2013.01); *G01S 17/34* (2020.01)

(58) Field of Classification Search
    CPC .... G01S 7/4818; G01S 7/4816; G01S 7/4817; G01S 7/4814; G01S 7/4812; G01S 17/32; G01S 17/34; G01S 7/4808
    See application file for complete search history.

(56) References Cited

U.S. PATENT DOCUMENTS

| | | | |
|---|---|---|---|
| 8,190,030 B2 | 5/2012 | Leclair et al. | |
| 9,322,992 B2 | 4/2016 | Woodward et al. | |
| 2013/0054187 A1* | 2/2013 | Pochiraju | G01S 17/89 702/150 |
| 2019/0257927 A1* | 8/2019 | Yao | G01S 7/4817 |

OTHER PUBLICATIONS

Chan, Kin Pui, and Dennis K. Killinger. "Enhanced Detection of Atmospheric-Turbulence-Distorted 1-Mm Coherent Lidar Returns Using a Two-Dimensional Heterodyne Detector Array." Optics Letters, vol. 16, No. 16, 1991, p. 1219.

Weeks, Arthur R., et al. "Experimental Verification and Theory for an Eight-Element Multiple-Aperture Equal-Gain Coherent Laser Receiver for Laser Communications." Applied Optics, vol. 37, No. 21, 1998, p. 4782.

Favreau, Xavier, et al. "Four-Element Receiver for Pulsed 10-Mm Heterodyne Doppler Lidar." Applied Optics, vol. 39, No. 15, 2000, p. 2441.

Wissinger, A.B. "Lag Angle Compensation in a Space Borne Scanning Lidar." Lag Angle Compensation in a Space Borne Scanning Lidar, Aug. 1992.

Akram, M. Nadeem, et al. "Laser Speckle Reduction Due to Spatial and Angular Diversity Introduced by Fast Scanning Micromirror." Applied Optics, vol. 49, No. 17, 2010, p. 3297.

(Continued)

*Primary Examiner* — Luke D Ratcliffe

(57) ABSTRACT

An adaptive lag angle compensation scheme for coherent high-speed scanning LiDAR that accommodates diffraction-limited LiDAR beams and also accommodates mixing of return signals with the corresponding local oscillator signals.

19 Claims, 18 Drawing Sheets

(56) References Cited

OTHER PUBLICATIONS

Geisler, David J., et al. "Multi-Aperture Digital Coherent Combining for Free-Space Optical Communication Receivers." Optics Express, vol. 24, No. 12, 2016, p. 12661.

Xu, Jing, et al. "New Scheme of Coherent Array Detection to Cancel out Phase Fluctuations and Doppler Frequency Shift Due to Atmospheric Turbulence and Target Movement for Laser Communications." Free-Space Laser Communication Technologies XI, 1999.

Ozdur, Ibrahim, et al. "Photonic-Lantern-Based Coherent LIDAR System." Optics Express, vol. 23, No. 4, 2015, p. 5312.

Saloma, Caesar, et al. "Speckle Reduction by Wavelength and Space Diversity Using a Semiconductor Laser." Applied Optics, vol. 29, No. 6, 1990, p. 74.

* cited by examiner

COHERENT HIGH SPEED SCANNING LIDAR

RELATED APPLICATIONS

This application is a continuation of application Ser. No. 16/295,649 filed on Mar. 7, 2019, which claims the benefit of U.S. Application No. 62/640,293 filed on Mar. 8, 2018, that is herein incorporated by reference in its entirety.

TECHNICAL FIELD

The present invention relates generally to a system and a method for coherent laser radar (LiDAR, or LaDAR) that incorporates high speed laser beam scanning in the presence of significant distances and corresponding round trip time delays. LiDAR can be distinguished from RADAR generally by the electromagnetic frequencies used: LiDAR uses 'optical' frequencies in the ~THz range, while RADAR uses 'electrical' frequencies in the ~GHz range. Other fields that may benefit from the present invention are interferometric metrology, terrain mapping, aerospace, defense, etc.

BACKGROUND

Coherent LiDAR, or Frequency Modulated Continuous Wave (FMCW) LiDAR, or Swept Source LiDAR, are well-known techniques for laser-based distance measurements (ranging), laser-based metrology (measurements), and combined laser ranging and imaging, among other applications. Coherent LiDAR distinguishes itself from more traditional Time-of-Flight (ToF) LiDAR techniques through the use of coherent detection as opposed to direct detection. It may also utilize a continuous wave laser with a linear frequency sweep as opposed to short pulses of light used in ToF LiDAR. Additionally, coherent LiDAR generally provides velocity information along with distance, making it preferable for applications with that requirement.

With the emergence of advanced driver assistance systems (ADAS), autonomous vehicles (e.g. self-driving cars or trucks), drone-based services, and other previously unforeseen markets, there is a need for LiDAR systems capable of high speed imaging. This high-speed imaging requirement arises due to the distances of objects/vehicles relative to the LiDAR subsystem, along with the need for the overall system to make a decision regarding the object/vehicle and react in time. Typically, this leads to a required LiDAR update rate (imaging rate, or frame rate) of between 10 Hz-100 Hz for objects/vehicles at distances between 10 m-300 m. The typical angular Field of View (FoV) for these LiDAR images can be anywhere from a narrow 10 degree (vertical)×30 degree (horizontal) to a wide and full-surround 40 degree (vertical)×360 degree (horizontal).

SUMMARY

Historically, coherent LiDAR imaging systems operate in a mode called 'step-and-stare', where a single voxel (a 3-dimensional pixel, or here a 2-dimensional pixel that may also include reflectivity/distance/velocity/etc. information) is acquired and then the system 'steps' to the next voxel and stares to acquire the data, then repeats, etc. This system has the burden of the time required to stare plus the time required to step (and settle), multiplied by the total number of pixels in the image. This step-and-stare mode becomes prohibitively slow for higher resolution (larger voxel count) imaging, especially when considering larger imaging distances and the corresponding time required (stare) for signal acquisition due to the finite speed of light.

There is a need for a coherent LiDAR system with increased imaging speed, while not conceding other benefits that arise from the coherent approach. LiDAR systems can increase their imaging speeds by moving to a continuously scanning, or resonantly-scanning, mode instead of the step-and-stare mode. If the distances involved in the LiDAR image are such that the round trip (LiDAR system to target/object and back to LiDAR system) time delay due to the speed of light is small compared to the time for transverse motion due to the angular laser scanning speed, then step-and-stare can be directly replaced with a scanning mode. This is, in fact, considered routine in the LiDAR Field for short distances with small time delays. However, problems arise if the time delays (distances) are larger, because the optical aperture of a scanning LiDAR system will have moved or rotated significantly during the time delay, resulting in the optical aperture no longer being pointed in the optimal direction for receiving light returning from the distant scattering target/object.

The present invention provides a solution to this fundamental scan speed/distance problem for coherent LiDAR. The above-described issue has historically represented a technical hurdle for coherent LiDAR that has forced users (1) to revert back to the step-and-stare mode for larger distances or (2) to switch LiDAR modalities from coherent to ToF. For ToF LiDAR, there exists a diversity of solutions to this scan speed/distance issue, including larger laser spot sizes, unequal transmit and receive spot sizes and Field of View (FoVs), bistatic LiDAR configurations, multi-detector configurations, among many others. For coherent LiDAR, with its need for near-diffraction-limited beam quality and near-perfect overlap (mixing) with a local oscillator 'copy' of the transmitted coherent LiDAR signal, the various ToF solutions have not provided an adequate solution.

One exception to this occurs for the situation of satellites, with LiDAR signals bouncing off the Earth. In that case, the satellite moves a huge distance in the time it takes for the light to reach the Earth, bounce off, and return to the satellite. However, the satellite knows the exact location of the spot on the Earth, knows the distance to the Earth, and it knows its own velocity. Therefore, the satellite can properly orient its receive optics so that they are still pointed exactly at the same spot on the Earth at the later time even though the satellite itself has physically moved a substantial distance. This technique is known in the Field as 'lag angle compensation', and it is only applicable because both the distances and the satellite parameters are known. However, for a LiDAR situation where the target/object distances are NOT known, and the relative motions of LiDAR platform and target/object are NOT known, lag angle compensation is not possible.

For coherent high-speed scanning LiDAR, an 'adaptive' lag angle compensation scheme is needed that accommodates diffraction-limited LiDAR beams and also accommodates the need for near-perfect mixing of return signals with the corresponding local oscillator signals.

The invention provides a closed form analysis of the scan speed/distance issue for coherent LiDAR, along with means for adaptive compensation of the effect.

BRIEF DESCRIPTION OF THE DRAWINGS

The annexed drawings, which are not necessarily to scale, show various aspects of the invention in which similar reference numerals are used to indicate the same or similar parts in the various views.

DETAILED DESCRIPTION

Figure 1:
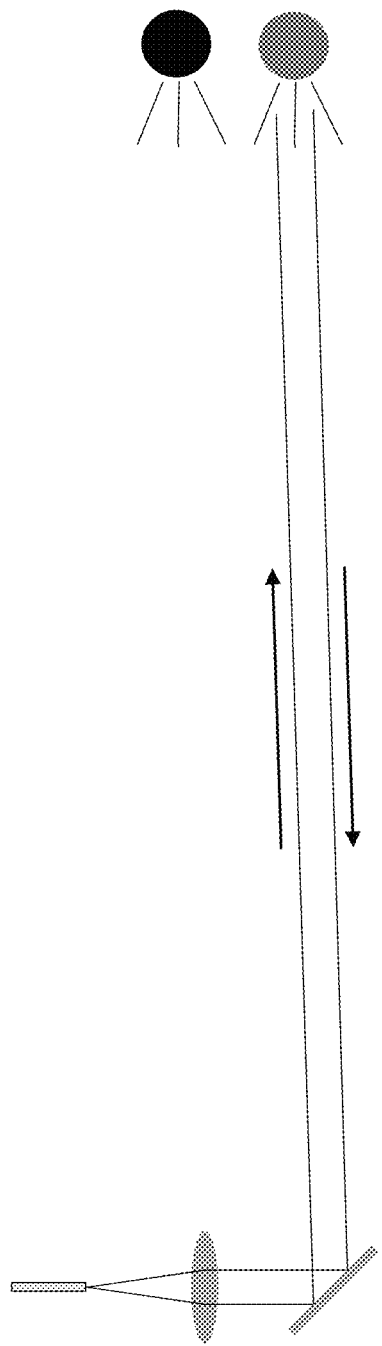
FIG. 1 shows an exemplary LiDAR configuration according to the disclosure, where light from an optical fiber is collimated by a lens and directed towards an object some distance away.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It is desirous to implement a coherent high-speed scanning LiDAR system that does not suffer the effects of the above-described scan speed/distance issue. FIG. 1 shows a simplified coherent LiDAR configuration, where light from an optical fiber is collimated by a lens and directed towards an object some distance away. The approximately collimated beam produces a 'spot' that illuminates at least a portion of the object. Some of the light scattered from the spot illuminating the object is directed back along the original path and may be received by the original optical fiber in a monostatic LiDAR geometry. While this is a simplified view of coherent LiDAR, it details the necessary aspects to understand the scan speed/distance issue. Significantly, for coherent LiDAR, it highlights the property that a coherent LiDAR system will only be sensitive to scattered light within a field of view (FoV) defined by the system's optics (typically, near-diffraction-limited, or approximately the spot above). In FIG. 1, for instance, any light that is scattered from a nearby object (black spot) will not be detected or it will be highly attenuated because it is nominally outside the illuminated (and therefore received) gray spot.

Figure 2:
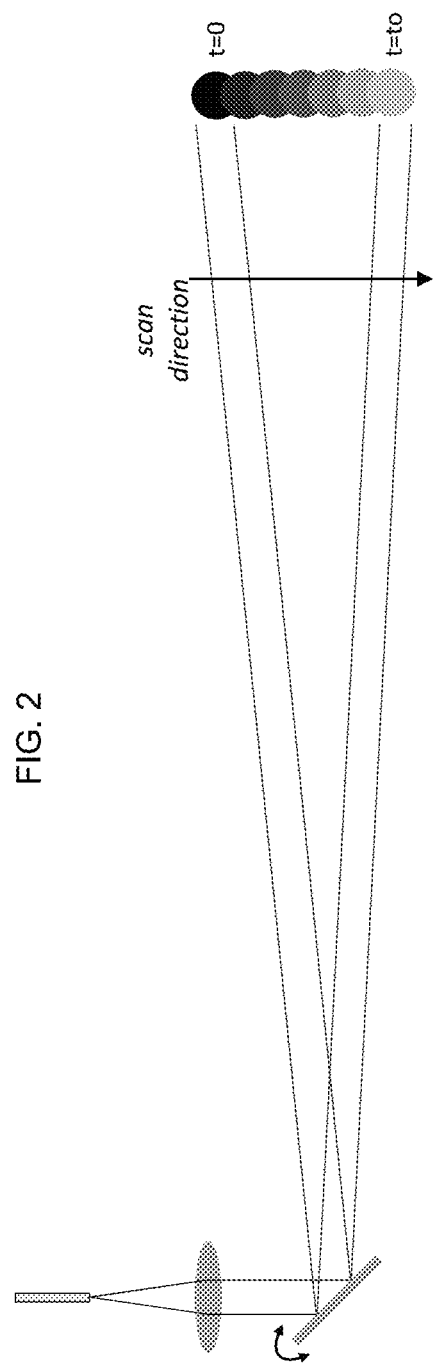
FIG. 2 shows a simplified LiDAR configuration, incorporating a scanning mirror and illustrating how the illuminated laser spot moves in time.

FIG. 2 shows a similar configuration to FIG. 1, but now the mirror in FIG. 2 is scanning, causing the illuminated spot to move in time as shown. If the illuminated spot at the object's distance is moving faster than the time it takes for the light to interact with an object and return to the receiver optics, then the receiver optics are effectively 'pointed in the wrong direction' and the scattered light will not be optimally received. In this scenario, the receiver optics may now be pointed at the spot labeled t=to, while the scattered light from the object is coming from the spot labeled t=0.

Figure 3:
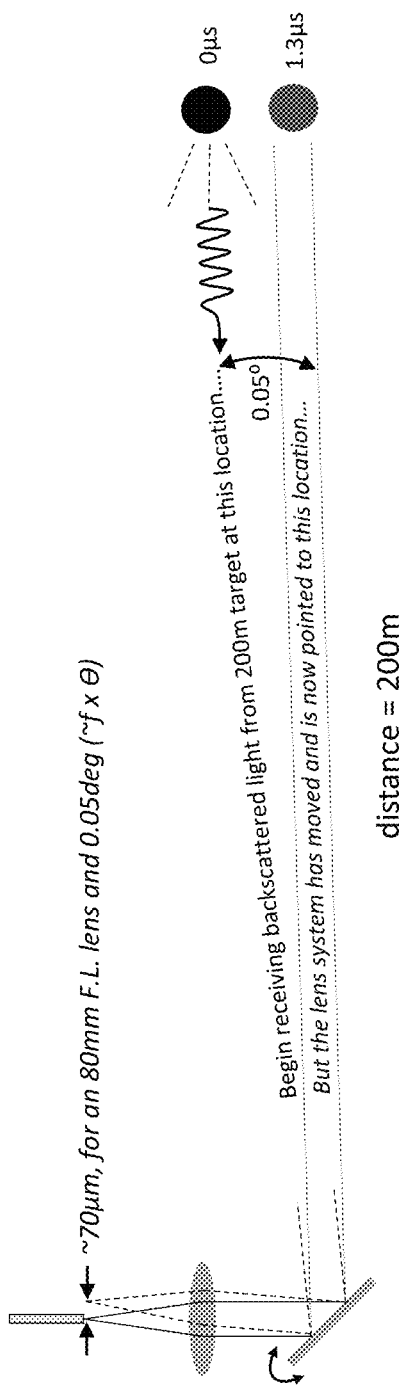
FIG. 3 adds exemplary detail to FIG. 1 and FIG. 2 for a distance of 200 m, a realistic fiber with 0.13 numerical aperture, a realistic lens of 80 mm focal length, and a realistic time frame of a few microseconds.

FIG. 3 adds quantitative detail to the scenario depicted in FIG. 2 for a distance of 200 m, a realistic fiber with 0.13 numerical aperture, a realistic lens of 80 mm focal length, and a realistic time frame of a few microseconds. Using these parameters produces an approximately collimated spot diameter of 2 cm at 200 m. If the scanning mirror has moved by 0.05 degrees in 1.3 microseconds (=2*distance/speed of light), then the illuminated spot will have moved by about 17 cm at 200 m. So, in this scenario the transmit/receive optics will be pointed at the spot labeled 1.3 us, but due to the round trip travel time of the light, the signal being received from the object will be coming from the direction labeled 0 us. This different in direction of returning electromagnetic radiation (also referred to as light) is well outside the FoV for the optics, and therefore the signal from the object will be greatly attenuated or unmeasurable.

Equivalently, we can say that, given the 0.05 degree difference in angle between the direction being illuminated (labeled 1.3 us) and the direction of the time-delayed scattered light signal at 200 m (labeled 0 us), that scattered light will miss the ~9 micrometer fiber aperture by ~70 micrometers (=80 mm*870 microradians=re, using this well-known property of lenses). By contrast, if the target distance is only 10-20 m, then the lateral shift of the returned light from the target is only 3.5-7 micrometers and the loss of signal may therefore not be as significant.

These examples serve to highlight and somewhat quantify the scan speed/distance issue and also further highlight why coherent LiDAR has historically been limited to using the step-and-stare modality for longer distances (rather than a high-speed scanning modality). The step-and-stare mode avoids this issue by not moving the optics (i.e., stepping or scanning the optics) to the next position until all of the signal (i.e., the electromagnetic radiation) has returned from the object (stare). Simply making the illuminated spot so large that it covers the entire distance spanned in a scanning sub-interval ('defocusing the optics') is not feasible, because the coherent signal is reduced by a strong factor related to the defocus and because the signal is attenuated faster than the scan speed/distance problem is reduced. While various optical defocusing strategies of this sort have been shown to work for ToF LiDAR, it is far more difficult (if not unfeasible) for coherent LiDAR. For coherent LiDAR, the optimal beam size or spot size must be close to the diffraction-limited spot for the optical aperture involved.

Figure 4:
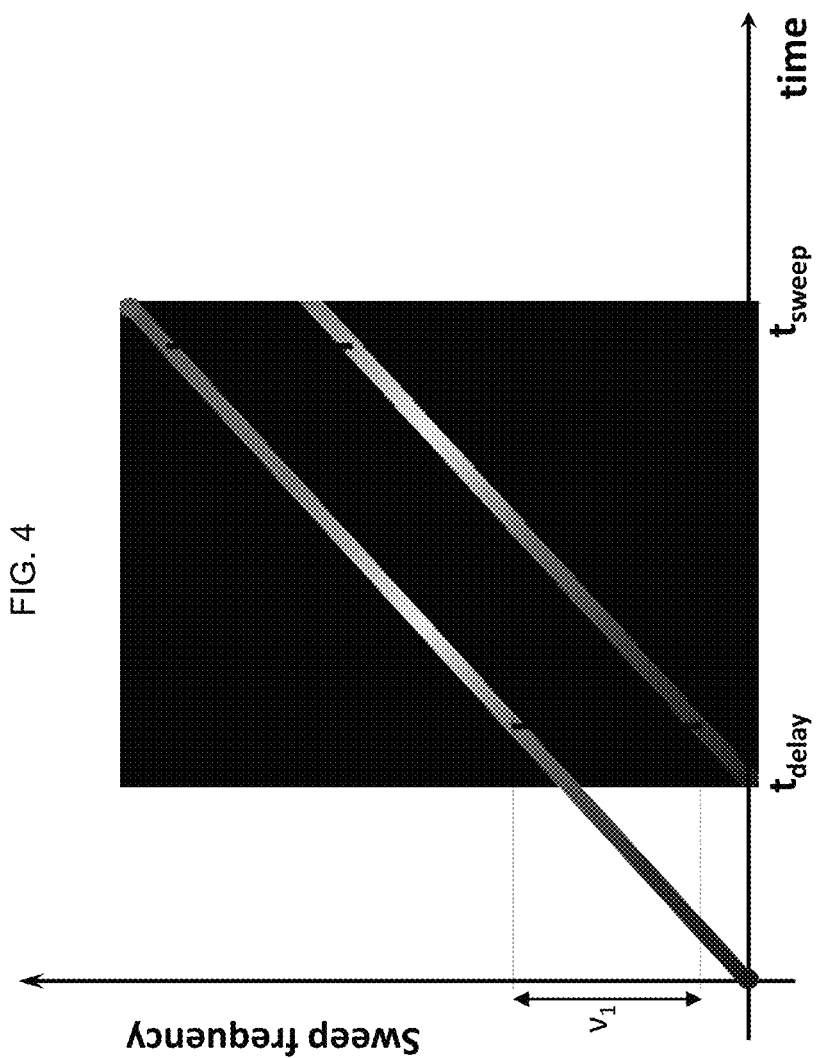
FIG. 4 shows a transmitted laser frequency sweep for an FMCW LiDAR configuration, along with the identical but time-delayed return laser frequency sweep that represents the LiDAR signal.

FIG. 4 is shown to further quantify the scan speed/distance issue. FIG. 4 shows a linear frequency sweep of duration $t_{sweep}$, and a corresponding LiDAR return sweep delayed by $t_{delay}$. This scenario results in a constant frequency difference between the two sweeps of $v_1$. By way of example only, for coherent LiDAR using the Frequency Modulated Continuous Wave (FMCW) technique, a single voxel of the image may be associated with a single linear frequency sweep of the LiDAR system's electromagnetic radiation source (also referred to as a laser) (assuming no averaging of sweeps). FIG. 4 shows such a transmitted sweep, along with the identical but time-delayed return sweep that represents the LiDAR signal. The instantaneous frequency difference between these two signals is constant for a given time delay $t_{delay}$, so that each frequency difference detected can be associated with a unique target/object distance. For the scan speed/distance issue, the characteristic time scale in FIG. 4 is the total sweep time $t_{sweep}$. Other coherent LiDAR techniques will have an analogous time interval, so the following analysis assuming FMCW LiDAR can be considered general.

Figure 5:
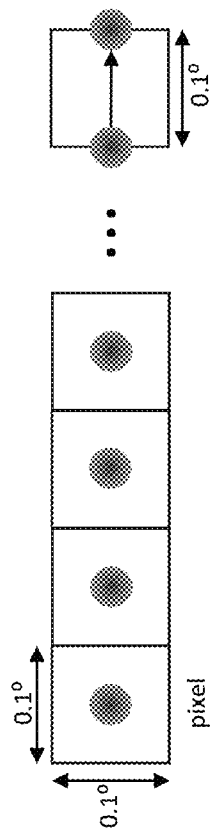
FIG. 5 shows the distance a scanned LiDAR illumination spot may move within a pixel before contaminating an adjacent pixel.

For scanning coherent LiDAR, an exemplary criteria is for the maximum angular scan speed ω to be determined by the desired angular resolution of the LiDAR image. For instance, if the desired angular resolution is 0.1 degrees and if it is further desired to prevent one voxel from overlapping the next adjacent voxel, then a single frequency sweep must be completed within the time required to scan by 0.1 degrees (i.e., the max motion allowed during a single sweep). This situation is depicted in FIG. 5, for the case of 0.1 degree angular resolution and a LiDAR system producing a spot size smaller than this is shown. The maximum linear spot motion before contaminating an adjacent pixel corresponds to the angular resolution. The linear velocity of the spot at distance L is then given by $$\Delta' = \omega L$$

Figure 6:
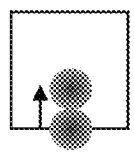
FIG. 6 shows the amount of displacement on a target that a scanned LiDAR illumination spot may move during a single round-trip before a signal penalty is incurred.

As mentioned above, and discussed regarding FIGS. 1-3, when there is a difference in angle between the direction being illuminated and the direction of the scattered light signal, the coherent signal is greatly reduced. Translating this into spot sizes at a given distance, our measured data indicates that when the transmit spot and the receive spot differ by one spot diameter d then the coherent signal is attenuated by ~10 dB. This situation is shown in FIG. 6. This 10 dB point, or scan motion leading to a one spot diameter mismatch, can serve as a reference point for this analysis. So, for a given angular scan speed ω, at what target distance will the laser spot have moved by one spot size in one round trip? This will be the distance L where the coherent signal is reduced by 10 dB. The target distance L can be written in terms of the time of flight as follows:

$$L = \frac{cT}{2}$$

While the physical distance Δ that the laser spot moves, in one round trip, is $$\Delta = \Delta' * T = \omega * L * T = \omega * L * \left(\frac{2L}{c}\right) = \frac{2\omega}{c} L^2$$

Setting this physical distance equal to one laser spot diameter d, and solving for L $$L = \sqrt{\frac{cd}{2\omega}}$$

Summarizing, L is the approximate target distance where the coherent signal will be down ~10 dB due to laser spot motion, given an approximately collimated laser spot diameter d and angular scanning rate ω (neglecting effects such as diffraction).

As an example, for a 15 microsecond sweep and 0.1 deg angular resolution, ω=116 rad/sec. For a laser spot diameter of d=3 mm, then L=62 m. This means that for distance significantly less than 62 m, the loss of measured signal due to the scan speed/distance issue is small—that is, for say 20-30 m maximum range, scanning at 116 rad/sec works just fine. However, if we have a 3 microsecond sweep at 0.1 deg angular resolution, then ω=580 rad/sec. If we further take a larger laser spot diameter (larger optical aperture) of d=30 mm, which is typically necessary to receive weak LiDAR signals at larger distances, then L=88 m. This means that, for higher scan speeds with a larger spot diameter, the 10 dB limit is only 88 m. One caveat for this analysis: it is highly unlikely that a LiDAR system will be designed to tolerate a 10 dB reduction in the system architecture (since many other factors also reduce SNR), so the true coherent LiDAR limit for these parameters is significantly less than 88 m. While it appears that simply increasing the beam diameter can improve this maximum range, for coherent LiDAR there is an optimum beam diameter due to speckle effects beyond which the signal may not increase. Further, many relevant commercial applications, such as autonomous vehicles, will not allow increases in beam size due to restrictions of cost, size, and weight.

Figure 7:
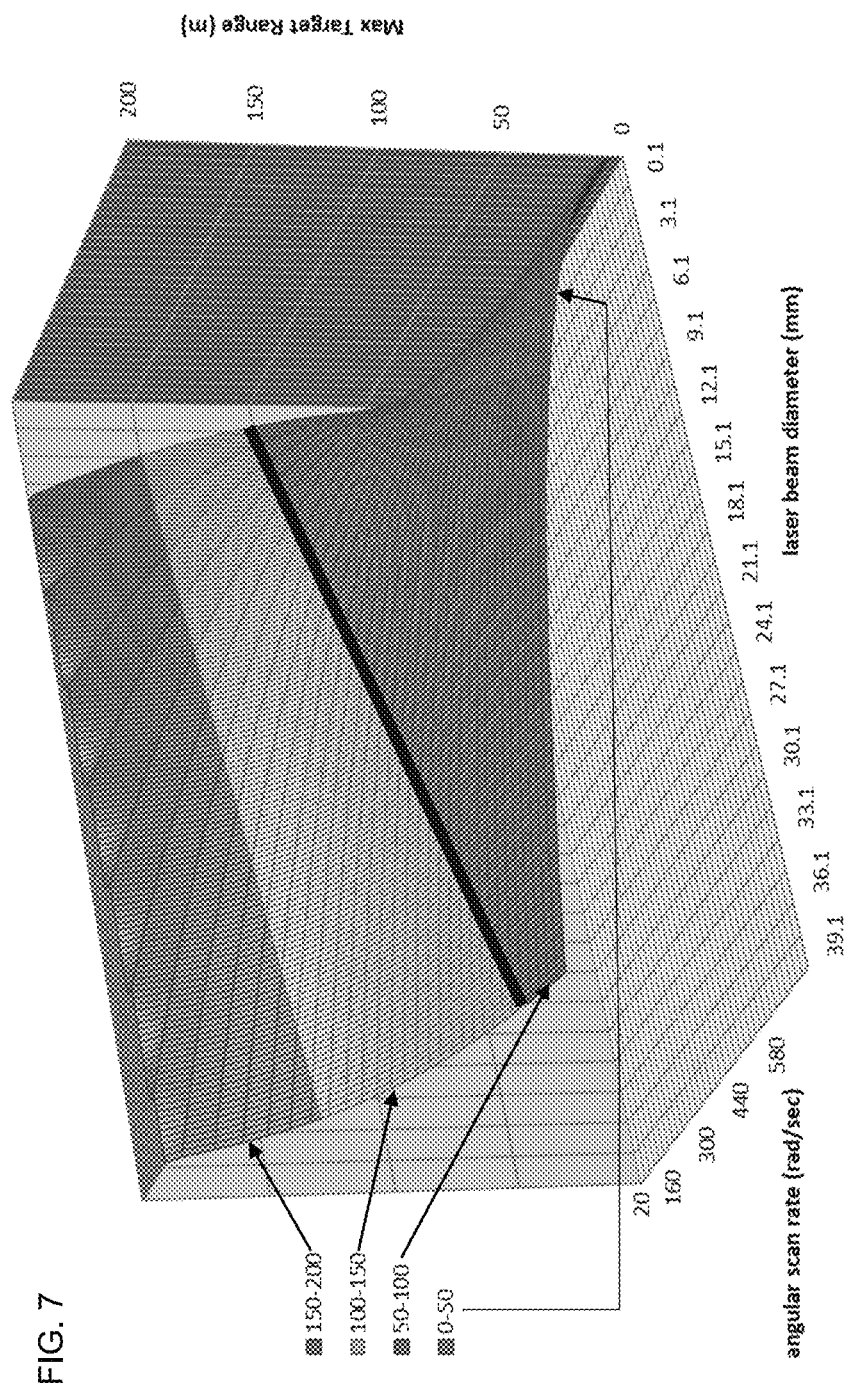
FIG. 7 shows the functional dependence of the LiDAR spot motion penalty, given an angular scan rate and a laser beam diameter.
Figure 8:
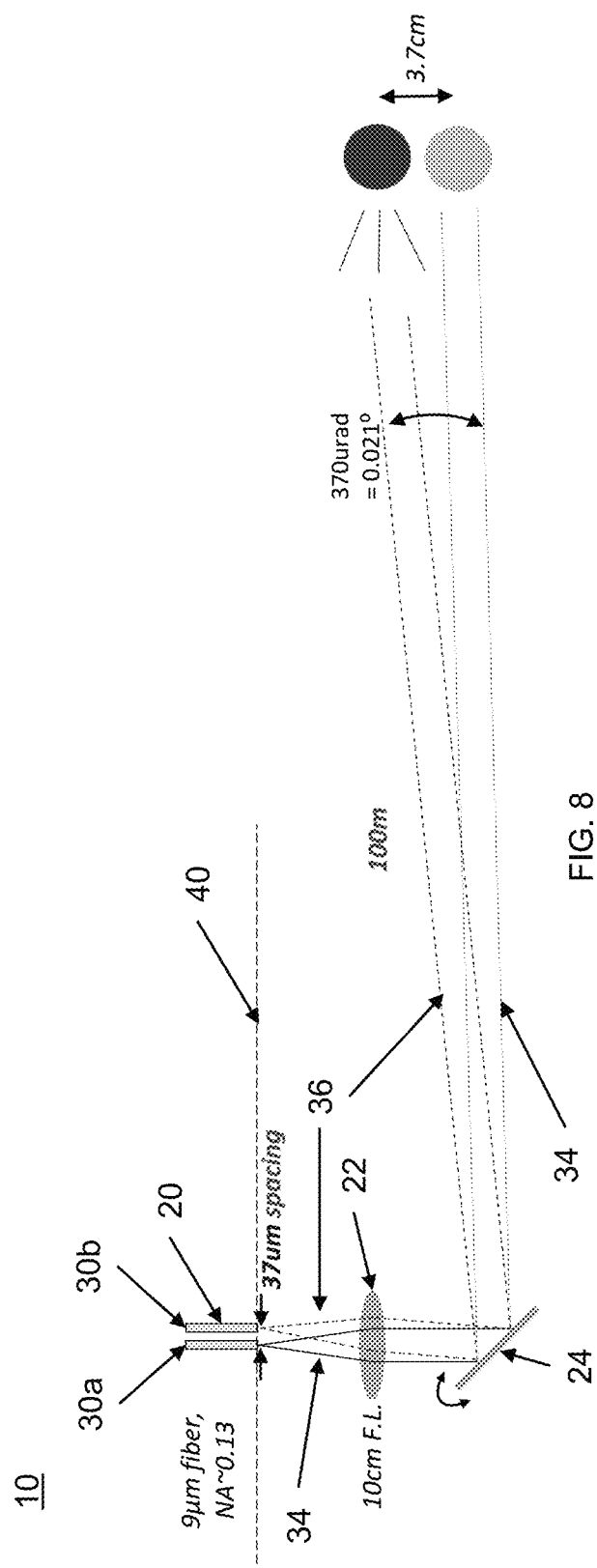
FIG. 8 shows an example monostatic LiDAR configuration designed for exact lag compensation in a scanning system.

The preliminary interpretation of this analysis is that for a given beam diameter and angular scan rate, there is a range limit for coherent LiDAR using a single transmit and receive fiber aperture. This is shown in FIG. 7 as a 3D graph of the equation above. At slow scan speeds, the max range can be large. At small spot diameters and high scan speeds, the max range is very small. The solid line in FIG. 7 represents the (d,ω) parameter combinations where the coherent signal is down 10 dB at 100 m due to scanning effects. A second observation is the following: If a second detection aperture is positioned trailing exactly one spot diameter away, the time-delayed, spatially offset signal could be completely recovered. This lag compensation works because it is designed for a specific, known distance (for example the solid line at a constant 100 m, in this graph). FIG. 8 shows this situation for our notional FMCW LiDAR system, where the scan speed is such that the spot has moved by 3.7 cm at 100 m in one round trip time (0.021 degrees). In order to fully recover the signal from this time delayed and spatially offset spot, a second fiber aperture, positioned 37 micrometers away, would be necessary, as shown. And, if our targets were always 100 m away and our (d,ω) pair was correct and constant, then we would have perfect lag compensation. However, for a general LiDAR situation, what is needed is an adaptive detection aperture, or adaptive lag compensation, that moves properly with range so that distances to targets do not need to be known in advance.

Turning to FIG. 8, an optical system 10 for use in a monostatic coherent scanning LiDAR system is shown. The optical system 10 includes an optical element 20, a single optical aperture 22, and a scanning system 24. The optical element 20 includes a plurality of optical paths 30 and is configured to relay the waveform (e.g., generated by an electromagnetic radiation source 42) to the single optical aperture 22. As is described in further detail below, the plurality of optical paths 30 are located at specific spatial positions in a focal plane 40 of the single optical aperture 22. The single optical aperture 22 is configured to receive the waveform of electromagnetic radiation 32 and to transmit the waveform 32 as a beam of electromagnetic radiation 34 with a characteristic beam diameter to interact with an environment.

The single optical aperture 22 also receives a portion of the emitted beam returning after interacting with the environment at distances of interest. The scanning system 24 is configured to direct the transmitted beam 34 through a range of angles into the environment at a characteristic scanning rate and to direct the returning beam 36 onto the plurality of optical paths 30. The angular scanning rate of the scanner is determined based on the characteristic beam diameter, the characteristic time scale, the specific spatial positions of the plurality of optical paths, and the distances of interest. The plurality of optical paths 30 includes one or more receive paths. The optical element 20 relays the returning beam to the sensor 44.

The single optical aperture 22 may comprise one or more optical elements in series (sequence), having a single defined mechanical extent such as an optical diameter. An exemplary optical aperture is that associated with a camera lens, containing multiple optical elements but having a single defining mechanical diameter. This should be contrasted to the example of two lenses, sitting side-by-side, representing two optical apertures.

The optical element 20 may be comprised of optical waveguides, photonic circuits, optical fibers, light guides, or any other suitable structure for receiving and directing light from particular locations.

The scanning system 24 may comprise one or more of a moving mirror, a moving optic, a moving lens, a diffraction grating, a phased array, electronically-steerable optical mechanisms, a combination of these elements, or any other structure known in the art and suitable for scanning light across different angles.

For the situation in FIG. 8, the exact condition for placement of the second fiber aperture (also referred to as an optical path) can be calculated. We know the physical distance that the laser spot moves, in one round trip, for a distance L, from above $$\Delta_{LiDAR} = \Delta' * T = \omega * L * T = \omega * L * \left(\frac{2L}{c}\right) = \frac{2\omega}{c}L^2$$

While the physical spot distance between two fiber detection apertures offset by I, at distance L, with lens focal length f, as shown in FIG. 8 is $$\Delta_{apertures} \cong L * \left(\frac{l}{f}\right)$$

Figure 9:
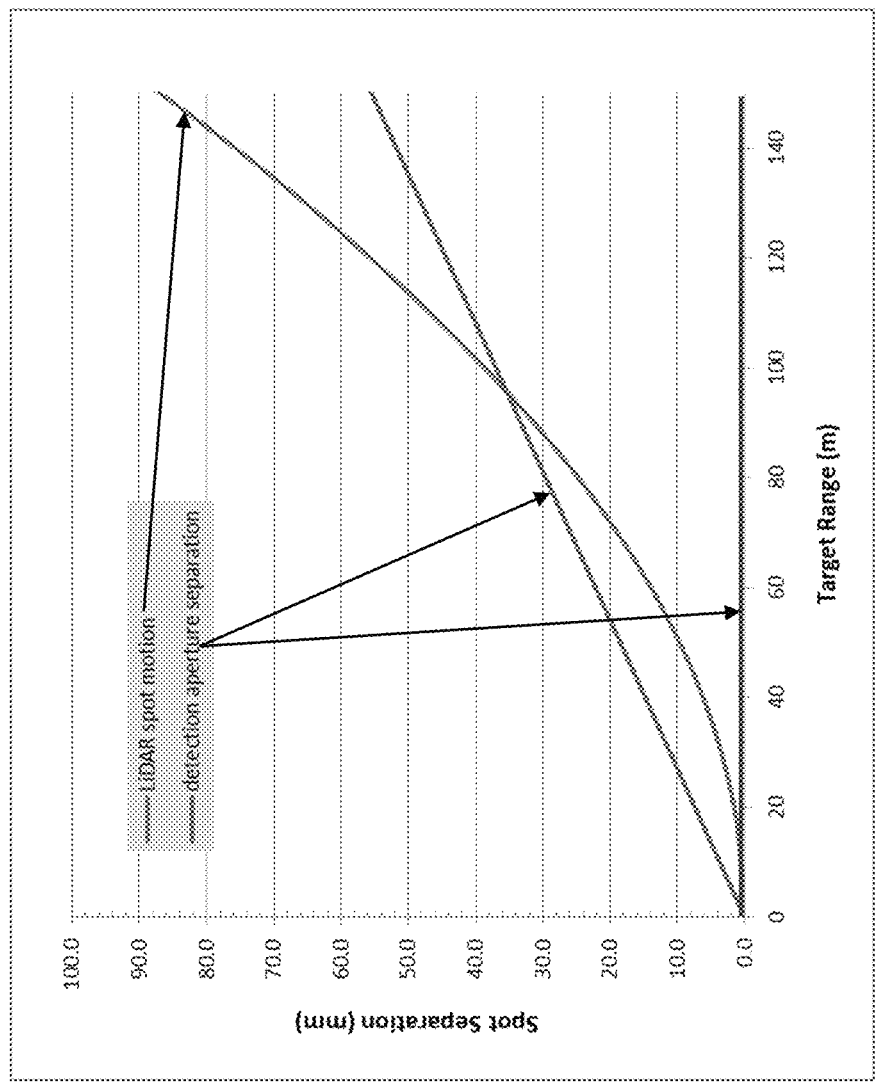
FIG. 9 shows the functional form of lag compensation in a scanning system, for a system with two apertures. Exact lag compensation occurs for only a single target distance.

Critically, these two distances do not scale in the same way: $\Delta_{LiDAR}$ scales as $L^2$, while $\Delta_{apertures}$ scales linearly with L. This implies that there can be no perfect match for the spacing of apertures (also referred to as optical paths) for all values of L, but they can be made equal for a specific value. These functions are shown in FIG. 9, for the conditions ω=580 rad/sec, I=37 micrometers (μm), f=0.1 m, as a function of L. As expected, at around L=100 m the second fiber detection aperture lines up perfectly with the scanning LiDAR spot, providing lag compensation for any target at that distance. For FIG. 9, it is understood that the first fiber detection aperture (transmit aperture) is represented by the x-axis in this graph. The spot motion for the configuration in FIG. 8 and FIG. 9 is shown more visually in FIG. 10.

Figure 10:
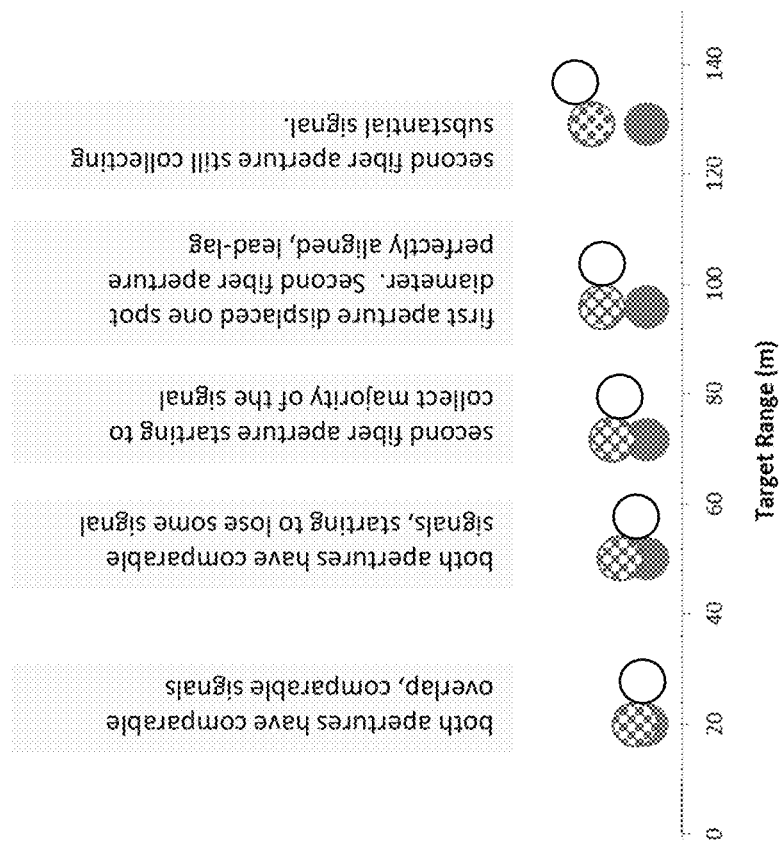
FIG. 10 shows a visual representation of the graph in FIG. 9, using the overlap of transmit aperture, receive aperture, and the illuminated LiDAR spot versus target distance.

Turning to FIG. 10, the plurality of optical paths 30 (also referred to as apertures) include a transmit path 30a through which the emitted waveform is transmitted to interact with the environment. The transmit path is offset in a scanning dimension from the one or more receive paths 30b within the focal plane 40 of the single optical aperture 22. The transmit path 30a and the one or more receive paths 30b are both located near the focal plane 40 of the single optical aperture 22. For example, the receive path(s) 30b being located "near" the focal plane 40 of the single optical aperture 22 may refer to an end of the receive path(s) 30b being located within 0.1 or 1 mm of the focal plane 40 along an axis perpendicular to the focal plane 40. As will be understood by one of ordinary skill in the art, the transmit path 30a may comprise one of the one or more receive paths 30b.

As will be understood by one of ordinary skill in the art, the reference to the optical paths 30 as apertures is separate from the single optical aperture 22. The single optical aperture 22 refers to the overall light-gathering capability of a remote sensing system, while the optical paths (also referred to as apertures) refers to how that gathered light is distributed in the focal plane of the single optical aperture. An example would be a single human eye, with a single optical aperture determined by the pupil, but with the optic nerve representing one of many potential sub-apertures in the focal plane of the eye.

In FIG. 10, the solid gray spot is the illumination spot, and represents the current location of the LiDAR transmit aperture. The empty spot represents the time-delayed and spatially offset LiDAR return spot, when scanning. The checkered spot represents the location of the spot viewed by the second fiber aperture, or the physical spot location where scattered light (i.e., light that has interacted with the environment) will return to the second fiber aperture. The visual displacements of the spots shown in FIG. 10 are given by the curves shown in FIG. 9. These spots are artificially offset in the horizontal direction for clarity, but the vertical overlap of the solid gray spot with the empty spot is a true indicator of the size of the LiDAR return signal into the transmit aperture, while the vertical overlap of the solid gray spot and the checkered spot represents the same for the second fiber aperture.

At 20 m, all three spots are basically overlapping, and the coherent LiDAR return signal could be received by either the transmitting fiber or the second fiber. In fact, there are a variety of optical and electronic means to sum or otherwise process these two signals. At around 50 m, the second fiber aperture is displacing faster than the LiDAR return spot, but both apertures are losing signal due to spot motion, at this point. At around 80 m, the transmit aperture has essentially lost most of the LiDAR return signal, but the second aperture is now overlapping well and is the dominant source of the LiDAR return signal. At 100 m, as above, the second fiber aperture aligns perfectly with the LiDAR return spot, and lag compensation is achieved at an optimal level. For even further distances, the LiDAR return spot begins to offset faster than the second fiber aperture, due to its $L^2$ dependence. But the second aperture is still picking up some signal, albeit decreasing more with distance.

The example shown in FIG. 10 and described above serves to demonstrate that having a second aperture is, in fact, a 'partially-adaptive' situation for a specific combination of target range, beam steering speed and spot size. The signals do not fail completely if perfect lag compensation is not achieved. Certainly, this shows that having two receiving apertures (i.e., optical paths) is an improvement over a single aperture (i.e., optical path). This situation is known and forms the basis for several multi-aperture-multi-receiver geometries. However, these systems use multiple lenses for their multiple apertures, which creates a number of disadvantages and restrictions, including increased cost/complexity/size/analysis, and more difficult alignment. The example described above as part of the present invention uses multiple fiber-based receivers but a SINGLE lens and a SINGLE aperture. This partially-adaptive situation can be generalized to a configuration that can be considered fully-adaptive.

Figure 11:
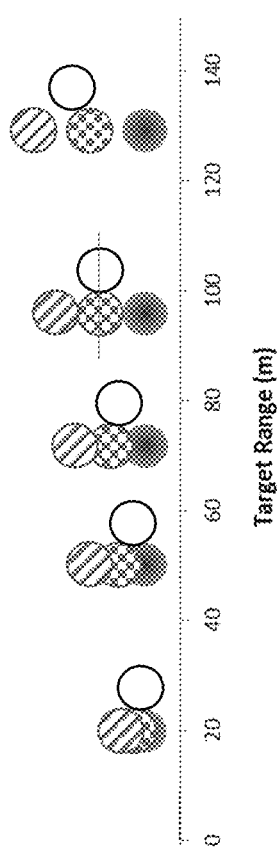
FIG. 11 shows the situation of FIG. 10, but with an additional receive aperture.
Figure 12:
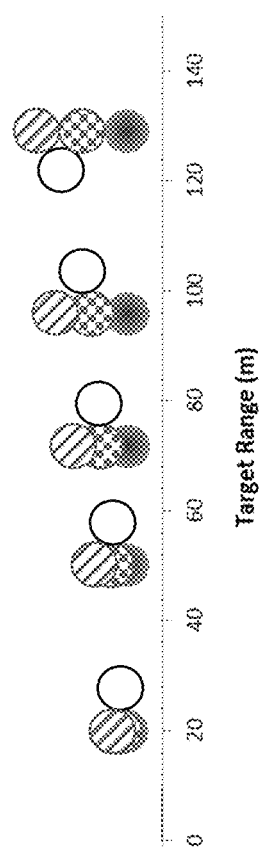
FIG. 12 shows the situation of FIG. 11, but with a decreased separation of apertures.

Turning to FIGS. 11 and 12, the transmit path 30a may include a plurality of transmit paths. Similarly, the one or more receive paths 30b may include a plurality of receive paths. The plurality of transmit paths and the plurality of receive paths may be spaced apart in the focal plane 40 of the single optical aperture 22 to accept signals from returning beams having a plurality of different times of flight, such that a returning beam received by a particular optical path 30 is correlated to a particular travel distance range for the returning beam. For example, the plurality of transmit paths and the plurality of receive paths may be non-uniformly or uniformly spaced. In a preferred embodiment, the plurality of transmit paths and the plurality of receive paths may be formed by a waveguiding structure.

FIG. 11 shows the same situation as FIG. 10, but with another fiber aperture (shown as a diagonally striped spot) spaced an equal distance away from the second fiber aperture (checkered spot) (another 37 micrometers in this example). For distances below ~30 m, the three apertures now form a single oblong effective aperture in the scanning direction, collecting the entire signal that can be received from a target in that range. While the total return signal is now spread across three effective apertures, none of it is 'lost'. And, there is no need for perfect lag compensation, nor is there a need to know the target distance in that range.

As the target distance increases, the three receive apertures begin to separate further, eventually creating spatial gaps where portions of the LiDAR signal will be lost completely (targets at those distances will only be partially detected due to low signal or not detected at all). Further improvement to this scenario is shown in FIG. 12, where the spacing between the three fiber apertures is decreased, leading to a smaller angular separation for their respective FoVs. Now the single oblong aperture is extended to around 80 m, and there are no true gaps between the apertures until target distances are beyond 140 m.

It should be reiterated here that combined processing of these multiple received signals can lead to substantial improvements to the coherent LiDAR signal. Indeed, for certain conditions, these multiple apertures can have a larger coherent signal than a single aperture of equivalent diameter. Such processing has not been performed previously using this type of unique multiple-receiver-single-aperture scenario, due to the historical belief that a scanning coherent LiDAR must use the step-and-stare mode at larger distances. Another key aspect of this invention is that the multiple paths used for the receive apertures do not have to be uniformly spaced. In fact, by spacing them in carefully chosen, nonuniform positions, a better match between the linear dependence of the receiver spots and the quadratic dependence of the LiDAR spot may be achieved. A final and obvious aspect of this invention is that there is no fundamental limit on the number of fiber apertures that can be used in this way; the practical limits arise due to factors such as classical optical aberrations and fiber spacing that can be achieved.

It will be understood by those skilled in the art that use of the term 'fiber' or 'fiber aperture' can be replaced by 'waveguide' and 'waveguide aperture', indicating that any suitable guided-wave structure can be used with this invention. Because the output aperture from a photonic chip (comprising III-V semiconductors, Si, SiN or other materials) may be smaller than for an optical fiber, the issue of coupling the returned coherent LiDAR signal from a target at substantial range may benefit even more from the present invention.

Figure 13:
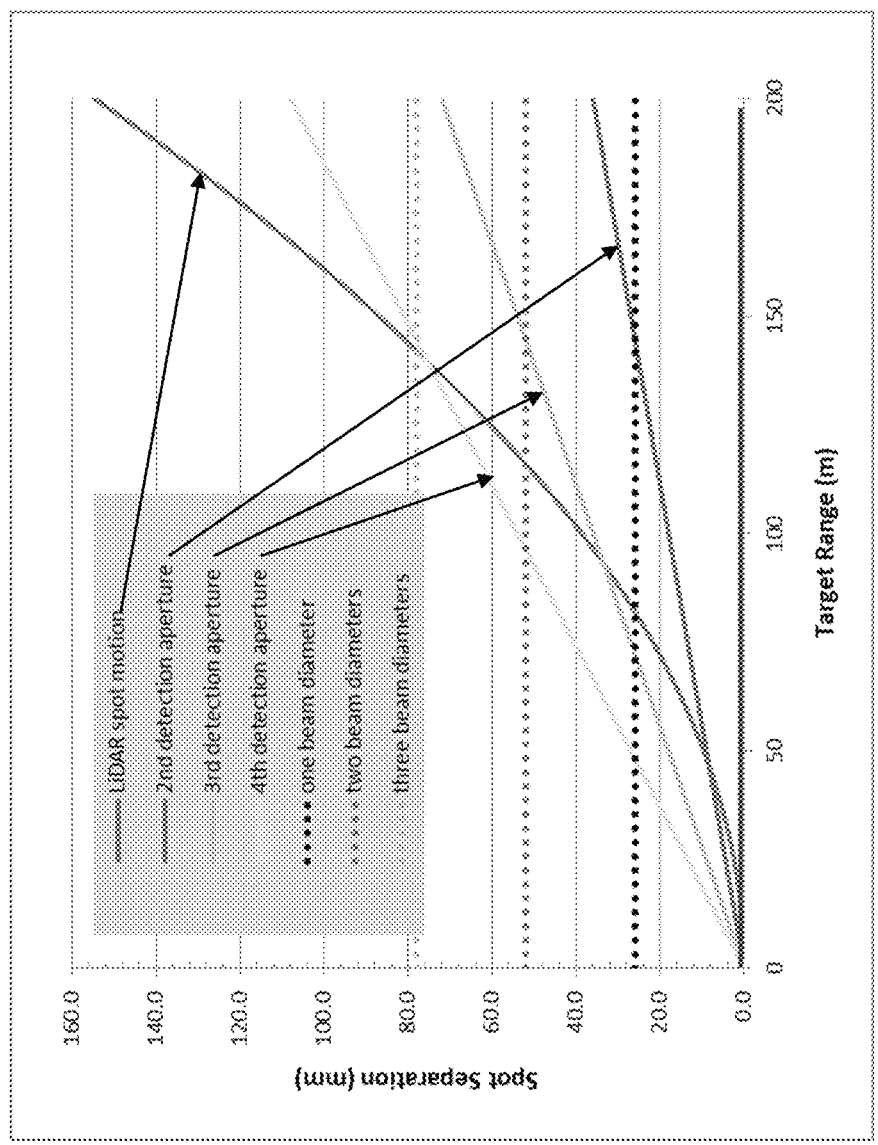
FIG. 13 shows a graphical example of adaptive lag compensation using four detection apertures, and also indicating the illuminated laser spot diameter.

As a final specific example of this invention, FIG. 13 shows a realistic scenario using four fiber detection ('receive') apertures (the first also being the transmit aperture, along the x-axis). This graph adds horizontal lines for the various spot separations corresponding to one, two, and three beam diameters, given fibers with numerical aperture of 0.13 and separation of 18 micrometers and a lens with focal length f=10 cm. The angular scan speed is ω=580 rad/sec. The combination of these four receive apertures enables robust detection of the return LiDAR signal to ranges past 150 m, even with this large scanning speed leading to a time delayed return spot that is more than three beam diameters from the current transmit spot. This scenario provides truly adaptive lag compensation for coherent LiDAR using a single optical element (monostatic), and without requiring knowledge of the target range a priori. Further, it provides means for and enables combining signals from multiple receiver fibers to reduce the speckle via spatial and angular diversity, or increasing the signal size via summation of apertures. It should be noted that in a scanning coherent LiDAR situation like this, traditional speckle reduction through spatial and angular diversity is somewhat inherent, as the spot is in rapid motion relative to time scales associated with the signal acquisition. Finally, it is clear that the transmit fiber (also one of the receive fibers) does not have to be in the spatial location for the FIG. 13 example. In fact, the transmit fiber could be in the middle and have receive-only fibers on either side of it, for instance, allowing lag compensation in both scanning directions along this plane of fibers.

Figure 14:
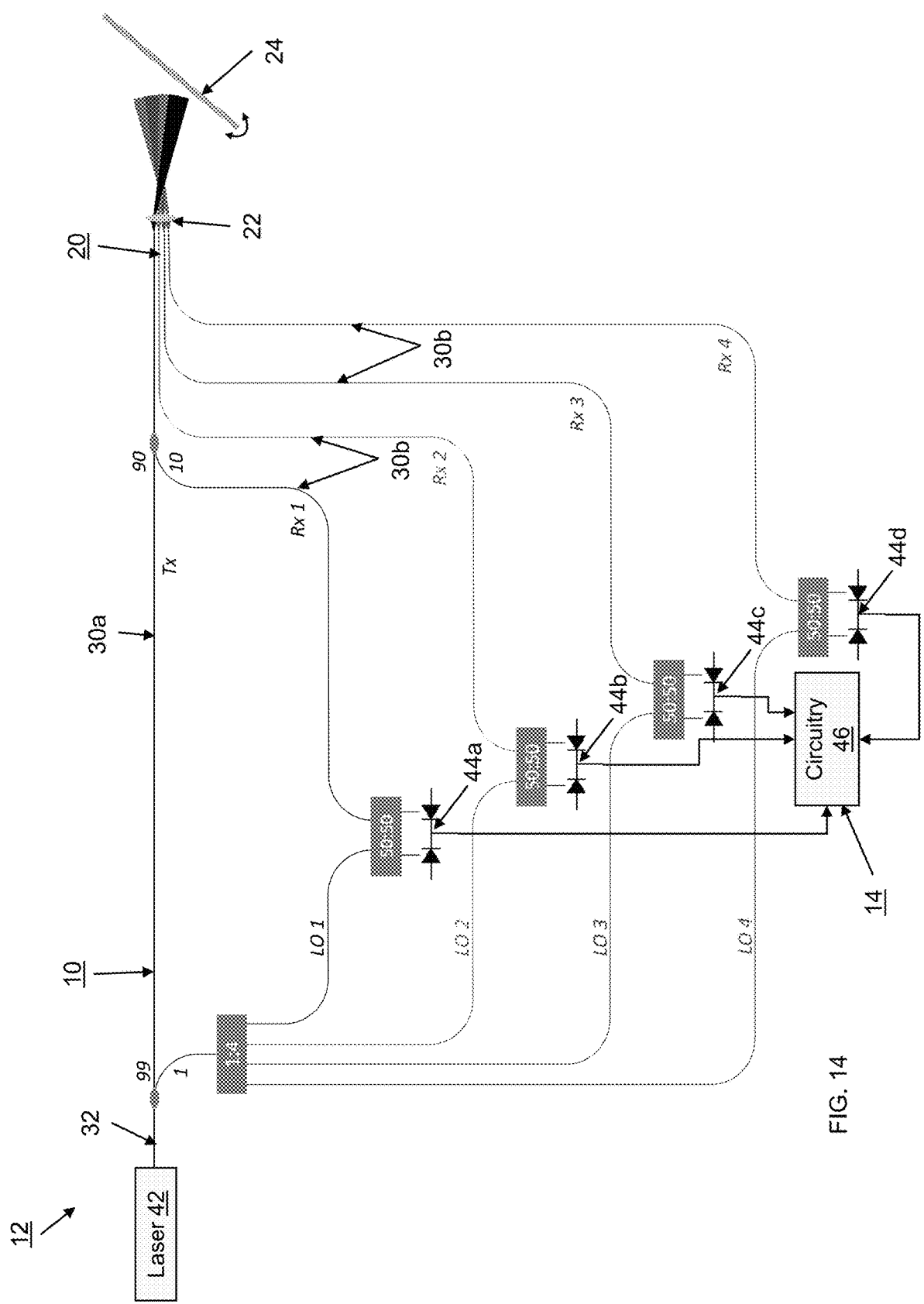
FIG. 14 shows an exemplary embodiment of this invention for an FMCW coherent LiDAR, with a 4-aperture adaptive lag compensation scheme in a scanning monostatic configuration.

Turning to FIG. 14, an optical sensor system 14 for use in a monostatic coherent scanning LiDAR system 12 is shown. The monostatic coherent scanning LiDAR system 12 may include an electromagnetic radiation source 42. The electromagnetic radiation 42 is configured to generate a waveform of electromagnetic radiation having a characteristic time scale. The characteristic time scale may refer to a profile of the radiation frequency vs time (e.g., a frequency sweep), or to a pulse width in time or pulse repetition rate for a pulsed coherent LiDAR, or to a total elapsed time for a sequence of pulses or sweeps.

The electromagnetic radiation source may comprise any suitable source of electromagnetic radiation. For example, the electromagnetic radiation source may comprise a semiconductor laser, e.g., a monolithic semiconductor laser, a Vernier-tuned distributed Bragg reflector (VT-DBR) laser, fiber-based laser, solid state laser, or any other suitable type.

The optical sensor system 14 includes a sensor 44 and the optical system 10. The returning beam 36 is received by multiple receive paths 30b of the plurality of receive paths 30. The sensor 44 is configured to detect returning electromagnetic radiation coherently mixed with a local oscillator. An output signal is generated by the sensor 44 due to the returning beam 36 received by the multiple receive paths 30b. The output signal may include subsignals, with each of the subsignals depending on the returning beam received by a particular receive path 30 of the plurality of optical paths 30.

The sensor 44 may comprise a photodiode or any device capable of detecting electromagnetic radiation and outputting an electrical signal based on the detected electromagnetic radiation. This may include a PIN diode, avalanche photodiode, photon counting device, or any of the many photon detectors known in the art.

Directing the transmitted waveform through the range of angles may result in a two-dimensional (2D) scan or a one-dimensional (1D) scan of the emitted beam across the environment. When performing a 2D scan, scanning in a first dimension of the 2D scan by the scanning system may be faster than scanning in a second dimension of the 2D scan by the scanning system. The transmit path and the one or more receive paths may be offset in the first dimension, the second dimension, or the first dimension and the second dimension.

FIG. 14 shows an exemplary embodiment of this invention for an FMCW coherent LiDAR as described above, with a 4-fiber adaptive lag compensation scheme in a scanning monostatic configuration. The means for beam scanning is shown here as a moving mirror redirecting the beam in the plane of the fibers. It is understood that more generally, the scanning means could be virtually any optical beam scanning system, and also more generally, the scanning occurs in two directions in order to create an image. In the situation with two directions of scanning, a fast scanning dimension will typically incorporate the adaptive lag compensation of this invention, while a slow scanning means enables completion of a 2-D LiDAR image. The optical parameters for lens and fiber placement could be those related to FIG. 13 above, providing means for an adaptive scanning lag compensation to over 150 m distances. While there are numerous ways to configure the four interferometers necessary for the coherent detection of FIG. 14, the scheme shown is an example that is amenable to fabrication via a Photonic Integrated Circuit (PIC) as it may only use couplers and no circulators.

With continued reference to FIG. 14, the fibers used to capture returning light from objects located at short ranges may be chosen to accommodate some light loss (e.g., only 10% of returning light from such fibers may be used in detection). Conversely, the fibers used to capture returning light from objects located at farther distances may be chosen to have less loss (e.g., over 95% or 100% of returning light from such fibers may be used in detection).

As described above, the invention disclosed herein differs from the prior art for the following reasons: (1) the prior art teaches only improving isolation and circumventing the use of circulators, (2) the prior art teaches closely spaced fibers in the focal plane of a lens having a fundamental range limit, (3) the prior art does not disclose scanning, scanning means, limitations due to time-of-flight and moving spots, lag compensation, or optimization of fiber spacing and beam size specifically to address the high-speed scanning issue above, (4) the prior art teaches against the use of the transmit fiber as an additional detection fiber, consistent with isolation improvements, (5) because the prior art avoids using transmit fiber as a detection fiber, there is necessarily a range limit and a blind spot inherent to the configurations described in the prior art.

Combining signals in various ways from multiple detection apertures has been mentioned in many applications of coherent LiDAR. Those methods are, of course, also possible for the present invention but there is a novel aspect that arises here due to the correlation of aperture, angle, and distance. To date, the multiple apertures that have been used in coherent LiDAR are used to increase the signal from a single LiDAR spot (target) at a fixed location or direction. Multiple apertures are all staring at that same location, in an attempt to improve the quality for the detected signal via spatial diversity and speckle averaging. Further, to date, most methods require precise optical-level phase control between the multiple apertures, as a requirement for their aperture combination schemes. While such phase-control methods are compatible with this invention, they add substantial cost and complexity for implementation and are generally undesirable. While initial implementations of this technology do not include this phase control, and certain applications may never need it, there are applications where phase control via multiple apertures would be useful. Especially with the scenario for this invention, where the multiple apertures could be positioned on a single photonic chip, phase control methods would become more attractive than they have historically.

For the described optical device and method, several novel aspects come into play. First, the multiple apertures involved here are not by definition staring at the same single illuminated location. These apertures are instead specifically optimized to address different angular regions related to a high speed moving LiDAR spot or, alternatively, the apertures are designed to address several spatially offset locations at a given range. Some of the adjacent apertures may have intentional partial overlap with each other, based on angles and range, while others (typically non-adjacent) may be at completely different viewing angles and, therefore, may have completely different spatial offsets. Critically, however, due to the scanning motion involved, there may be correlations between spot motion, spatial offsets, angle, and range.

Figure 15:
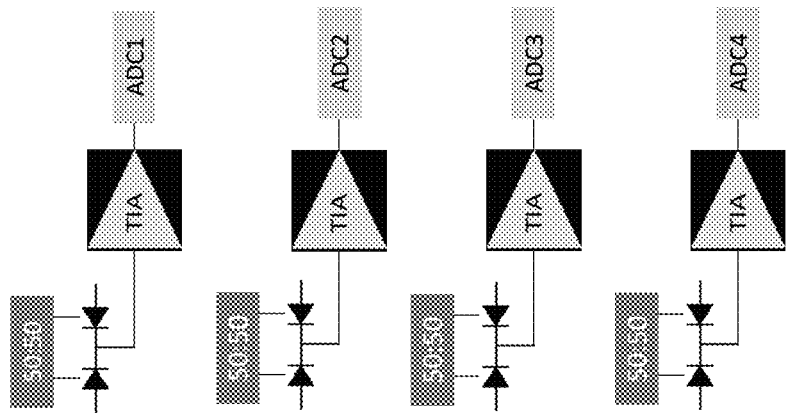
FIG. 15 shows a nominal method for signal detection using an exemplary 4-receiver scheme such as shown in FIG. 14.

Correlations between the detection apertures enable various means for electrically or optically combining signals from multiple apertures. FIG. 15 shows the nominal method for signal detection using an exemplary four-receiver scheme such as shown in FIG. 14. Each of the balanced detectors may have an optional transimpedance gain stage (TIA) before the individual ADC occurs. This allows great flexibility in electrical signal combination, as signals from any combination of apertures can be combined in any way. The exemplary embodiment shown in FIG. 15 allows for the use of many possible digital signal processing techniques, but utilizes multiple ADCs.

Figure 16:
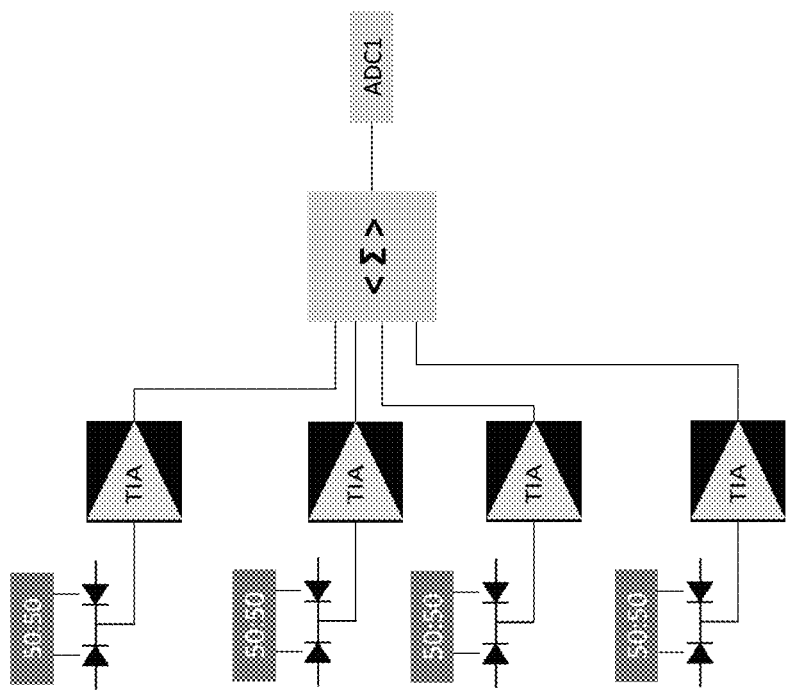
FIG. 16 shows an exemplary scheme for electrically combining signals from multiple apertures, where four signals are combined and signal-processed electrically prior to Analog-to-Digital conversion.

FIG. 16 shows another exemplary scheme for electrically combining signals from the multiple apertures, where the four signals are combined (either before or after the TIA stage, for example) and signal-processed electrically prior to ADC, so that only a single ADC is required for four apertures. This is a significant cost and functional simplification of the electrical requirements, especially in situations where the ADC must be very high speed—perhaps Giga Samples per Second (GSPS). Importantly, when performing high speed scanning LiDAR, it may typically be the case—especially at shorter ranges—that the returned LiDAR signal received by the device provides signal in several of the receiver apertures. Appropriate combination of these multiple signals may lead to situations where the LiDAR signal is improved or increased relative to the situation where only a single aperture is used. On the other hand, using the single ADC may limit the ability to perform digital signal processing.

With continued reference to FIG. 14, the system 14 may additionally include circuitry 46 configured to receive the subsignals included in the output signal. As is described in further detail below, the circuitry 46 may determine a distance to a target via the returning beam 36 based on the subsignals. Each of the plurality of receive paths 30 may be associated with a distance range and the determined distance may depend on a mathematical combination of the subsignals and the distance range of the associated receive paths that the subsignals correspond with.

With reference to FIG. 16, correlations enable a further unique aspect of this high speed scanning LiDAR configuration. Because of the scanning LiDAR spot motion, the respective apertures are correlated to range. For clarity, an exemplary four-aperture system is described here. The transmit aperture (acting as a receiver) detects signals from targets at short range, with round trip time delays that are small relative to the spot motion (say, 0-50 m). The first adjacent receive aperture detects some of these short range signals (0-50 m), as well as signals that are at medium ranges (e.g., 50-100 m) and have time delays leading to substantial spot motion. The second adjacent receive aperture detects some of the medium range signals (50-100 m), while also detecting targets at ranges leading to even longer time delays (say, 100-150 m). Finally, the fourth receive aperture detects some of the long-range signals (100-150 m) while also detecting signals with even larger delays (say, 150-200 m). The LiDAR designer optimizes the spacing of apertures such that the number of apertures, scanning speed, and desired maximum range can be met with a single system, along the lines of FIG. 13.

The importance of this range correlation manifests itself in several ways. First, by detecting a returning signal in a specific aperture, the target's coarse range is known due to the properties of the specific aperture. In the example above, if the signal only occurs in the fourth aperture, it is clear that the target cannot be at the shortest ranges, or else the first three apertures would have received a portion of the signal. Using this correlation, software algorithms may be applied to add fidelity to such coarse range approximation techniques. Second, in the case of FMCW coherent LiDAR, a target's range is ultimately detected as a frequency, after a standard Fourier transform of the time-domain detected signal. A direct consequence of high speed scanning in this situation is that the linear frequency sweep must also be completed rapidly (typically during a single pixel of the image). And, as the speed at which the sweep is completed gets faster, the resulting frequency for a target at a given range necessarily also increases. This leads to a high speed burden on virtually all of the electrical components (detectors, TIAs, ADCs, processors, software, etc.) included in the system.

Further, if the true frequency corresponding to a specific range is higher than can be detected by the system electronics (above Nyquist limit), that signal will be aliased to a lower frequency. This is generally known in the art as the 'ambiguous range' or 'ambiguity interval', meaning that the target's true range is now ambiguous and could be one of several aliased ranges. A variety of techniques have been developed to deal with this situation, in order to recover the target's true range in the presence of aliasing. Due specifically to the unique correlation between aperture and range caused by high speed scanning, this typically undesirable aliasing can be used to advantage.

If the electrical system is designed to have a maximum detection frequency of 1.6 GHz, and the optical system is designed to have a linear frequency sweep resulting in a detection frequency of 1.6 GHz at 150 m, then this leads to the classic range ambiguity above 150 m. Signals beyond 150 m will be aliased and appear at lower frequencies, thereby requiring some other means to determine if the true range is the lower frequency or if that lower frequency is an aliased version of a higher frequency. The high speed scanning LiDAR system described herein may provide the means to disambiguate these frequencies, because the signals from different receive apertures provide the necessary coarse range information. That is, a signal that only occurs in the transmit and first receive aperture, for instance, must be at short range. On the other hand, a signal that occurs only in the third and fourth aperture must be at long range, even if the resulting range frequencies from those apertures are aliased to much lower frequencies. This specific aspect of coherent high speed scanning LiDAR not only enables disambiguation of frequencies, but allows the designer to intentionally incorporate slower, lower cost electronics without a performance penalty.

Alternatively or additionally, the subsignals may each include a frequency corresponding to a distance. The circuitry may be configured to mathematically process the subsignals to disambiguate aliasing, such that subsignals identifying apparent distances for the corresponding receive paths are mathematically altered to account for known distance correlations between the respective paths in conjunction with known Nyquist limited electronic parameters of the system in a manner that results in a final distance determination that is not limited by the Nyquist limitations of any of the subsignals.

As will be understood by one of ordinary skill in the art, the circuitry 46 may have various implementations. For example, the circuitry 46 may include any suitable device, such as a processor (e.g., CPU), programmable circuit, integrated circuit, memory and I/O circuits, an application specific integrated circuit, microcontroller, complex programmable logic device, other programmable circuits, or the like. The circuitry 46 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the circuitry 46. The circuitry 46 may be communicatively coupled to the computer readable medium and network interface through a system bus, mother board, or using any other suitable structure known in the art.

Figure 17:
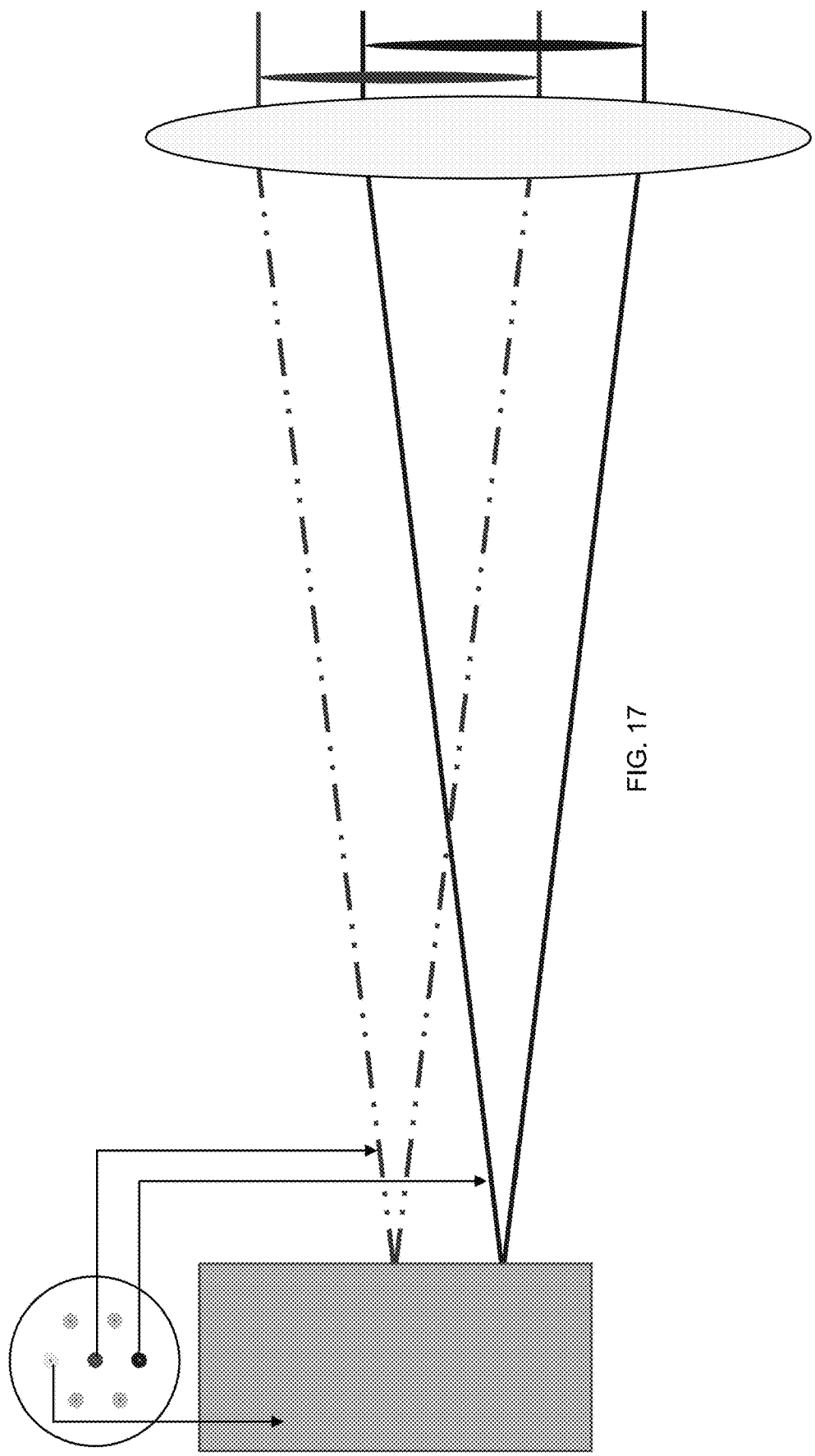
FIG. 17 shows an exemplary implementation of adaptive lag apertures using commercially-available 7-core, multi-core fiber.
Figure 18:
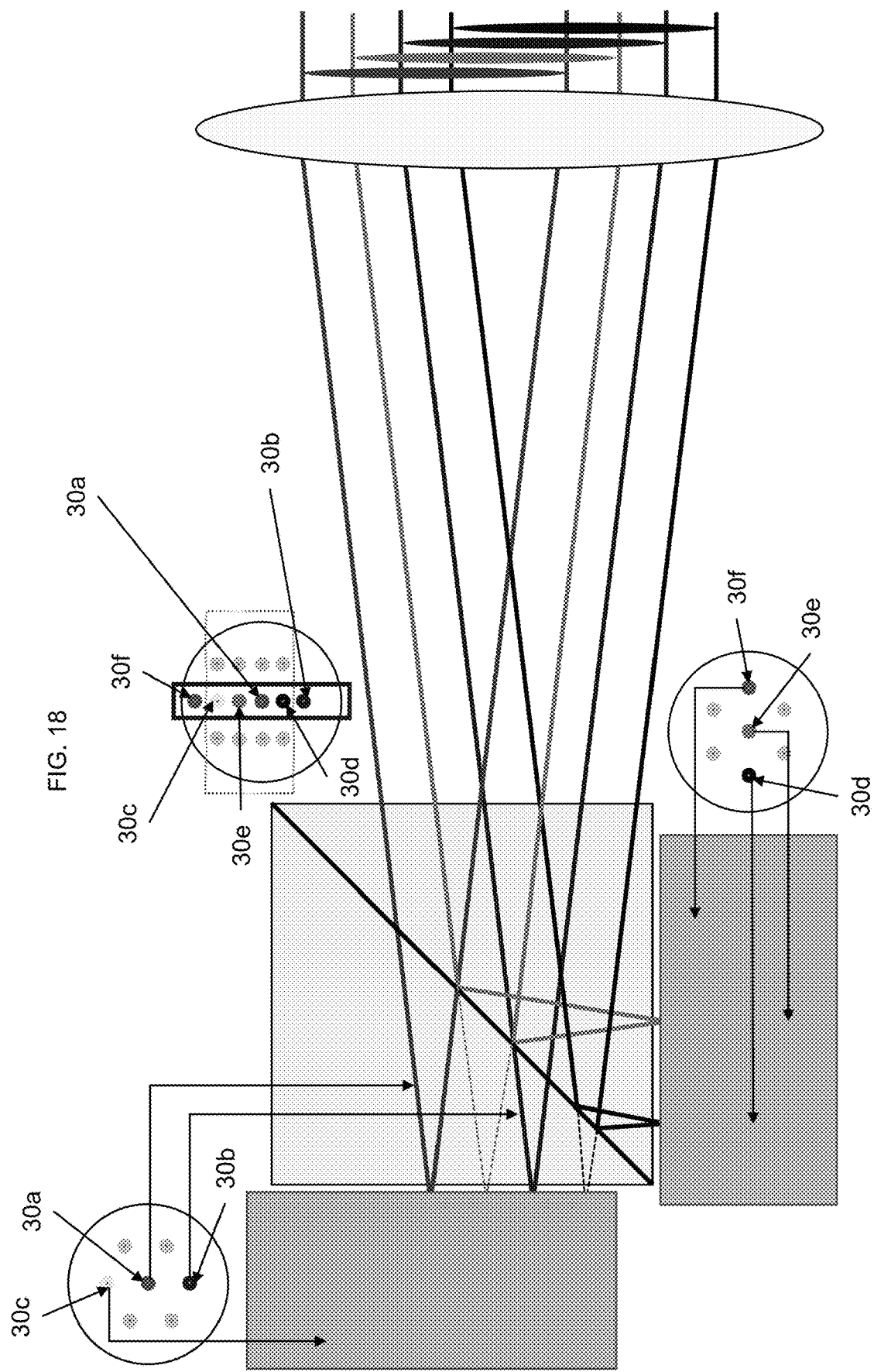
FIG. 18 shows an exemplary implementation of adaptive lag apertures using pairs of commercially-available 7-core, multi-core fiber, combined using an optical beam splitter such that the apparent aperture spacing is reduced by a factor of two.
Figure 19:
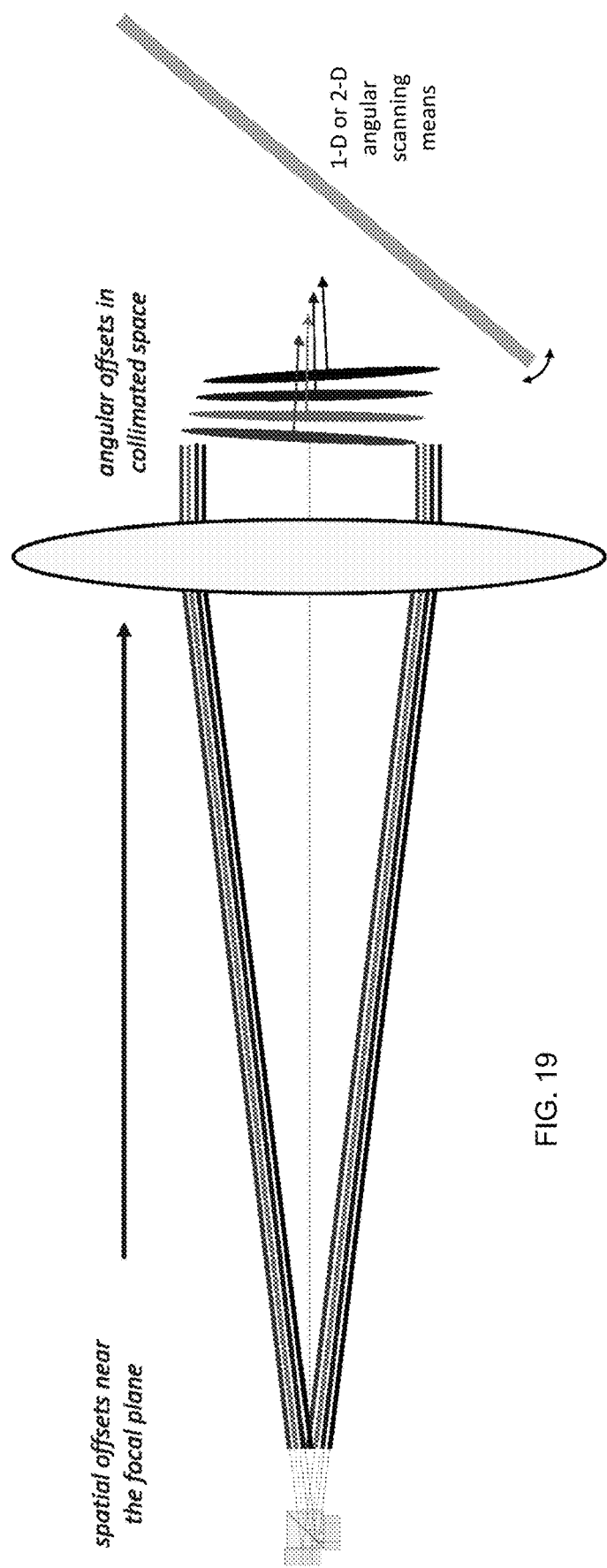
FIG. 19 shows an exemplary system-level diagram for adaptive lag compensation, showing more realistic spatial scales along with notional beam scanning means.

FIGS. 17-19 depict particular embodiments of a system including optimized patterning and positioning of apertures for adaptive lag compensation in coherent high speed scanning LiDAR. FIG. 17 shows a commercially-available 7-core, multi-core fiber where each fiber has the approximate qualities of SMF-28 fiber with numerical aperture ~0.13. Concentrating on only the center column, as shown, provides a linear spacing of apertures equal to 37 micrometers. If these apertures are positioned near the focal plane of a 100 mm lens, then the spatial overlap of the corresponding beams just after the lens will be nearly 100%, while their angular offsets will be ~37 micrometers/100 mm=370 microradians=0.02 deg. This reproduces the concepts described in FIGS. 8-10. However, as described above for FIG. 13, an improved situation can be realized with a smaller aperture spacing of 18 micrometers, which is not commercially available at this time for fiber NA~0.13.

FIG. 18 shows that, by using an optical beamsplitter and a second, spatially-offset, commercially-available 7-core multi-core fiber, the apparent aperture spacing is reduced by a factor of two. This particular scheme will have optical losses due to this beamsplitting arrangement, but serves to demonstrate that the adaptive lag performance associated with the conditions for FIG. 13 is readily achievable. In this scheme the polarization can be optimized for whichever fiber is used as the transmit aperture, assuring that the transmitted power is not attenuated, and only the received power encounters the potential optical loss penalty. An improved diagram, showing more realistic spatial scales along with a notional beam scanning means, is shown in FIG. 19.

Figure 20:
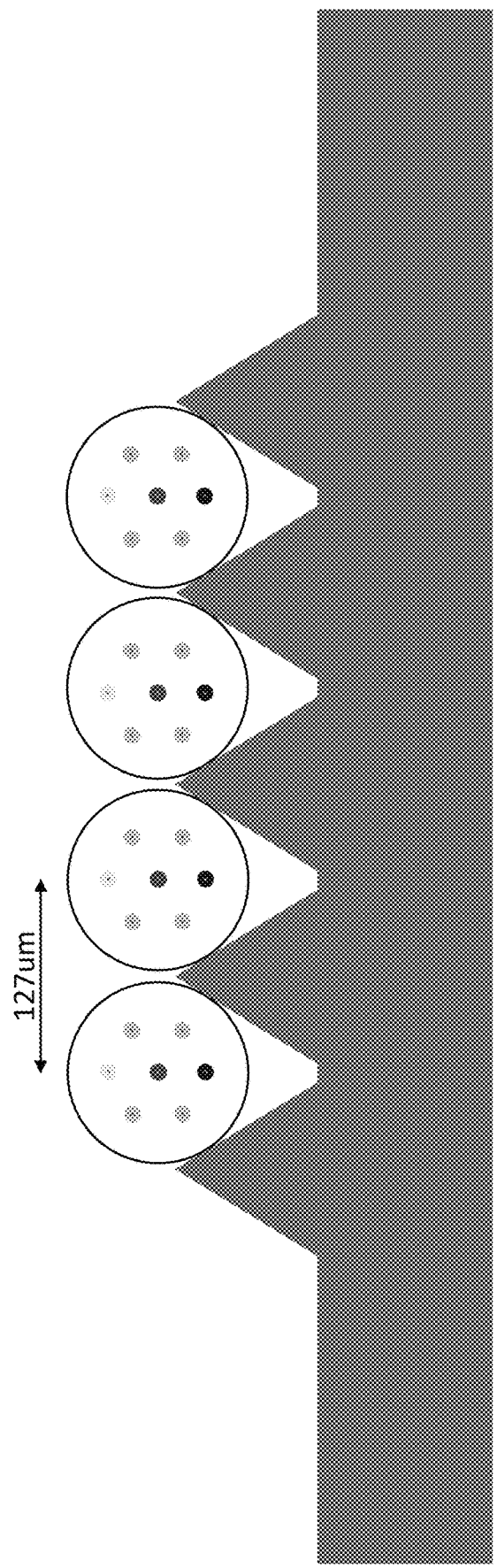
FIG. 20 shows an exemplary realization of four spatially offset 7-core fibers, using a commercially-available v-groove array configuration.

Finally, proper positioning of apertures for coherent high speed scanning LiDAR is shown for a situation where multiple simultaneous LiDAR beams are used, with additional spatial offsets, to further improve imaging speed. FIG. 20 shows an exemplary realization of four spatially offset 7-core fibers, using a commercially-available v-groove array configuration. Each of the separate fibers acts as an independent coherent high speed scanning LiDAR, along the lines described above, but now four of them can be operated simultaneously. For a v-groove spacing of 127 micrometers, this leads to an angular offset of ~0.07 degrees, while a spacing of 250 micrometers leads to 0.15 degrees. 0.07 deg and 0.15 deg represent typically desirable pixel separations for LiDAR imaging, enabling 4 independent pixels to be acquired simultaneously, each with adaptive lag compensation along the high-speed scanning dimension.

Figure 21:
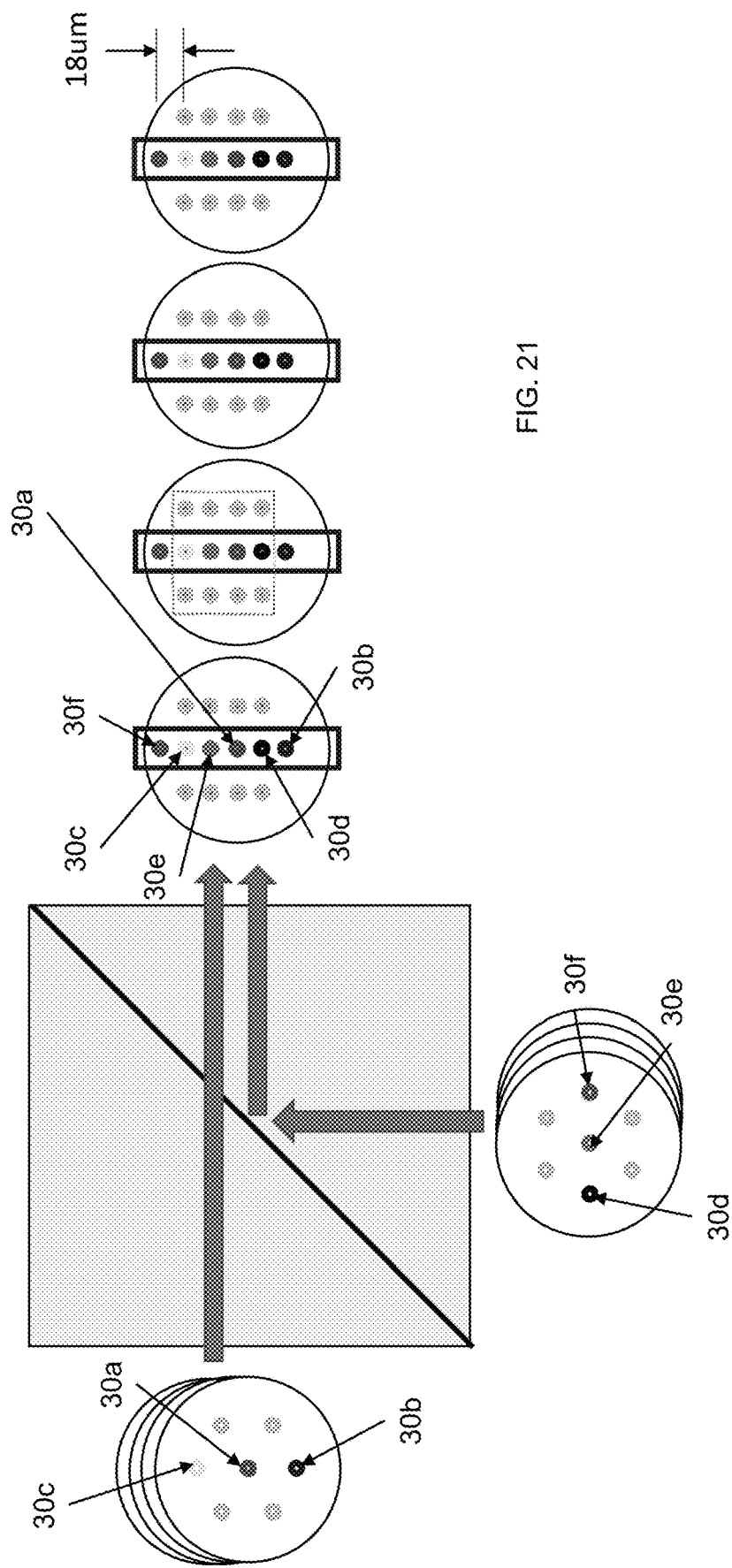
FIG. 21 shows that with optical beamsplitting means, adaptive lag compensation can be achieved in conjunction with four (or more) simultaneous LiDAR beams.

FIG. 21 further combines concepts, showing that with optical beamsplitting means, adaptive lag compensation aperture spacing of 18 micrometers can be achieved in conjunction with four simultaneous LiDAR beams each angularly separated by, e.g., 0.15 degrees. The exemplary configuration of FIG. 21 provides a single linear array of up to 6 apertures for adaptive lag compensation (middle fibers), or alternatively an array of 3×4 fibers. We note that by choosing one of the middle fibers as the transmit aperture, then adaptive lag compensation can be achieved in two scanning directions along the array of apertures. We further note that all of the adaptive lag compensation concepts outlined in this invention are amenable to realization using Photonic Integrated Circuits (PICs), multi-core fibers, waveguide devices, free space optics and detectors, various optical beam scanning means, or other optical means known by those skilled in the art.

Figure 22:
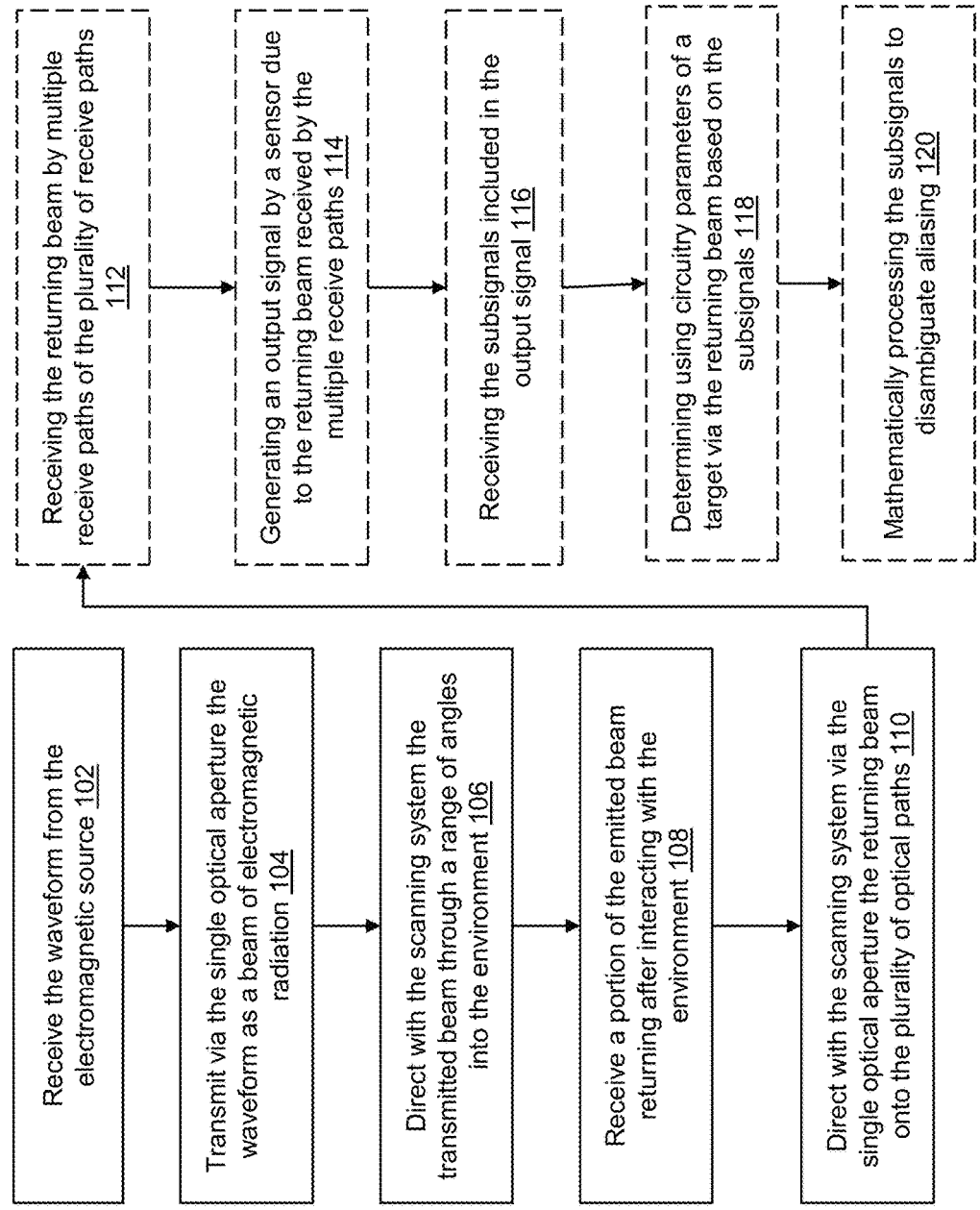
FIG. 22 shows a block diagram depicting a method for use in a monostatic coherent scanning LiDAR system.

Turning to FIG. 22, a method 100 for use in a monostatic coherent scanning LiDAR system is shown. In process block 102, the waveform generated by the electromagnetic radiation source is received by the single optical aperture. In process block 104, the single optical aperture transmits the waveform as a beam of electromagnetic radiation with a characteristic beam diameter to interact with an environment. In process block 106, the scanning system directs the transmitted waveform through a range of angles into the environment at a characteristic scanning rate. In process block 108, the single optical aperture receives a portion of the emitted beam returning after interacting with the environment at distances of interest. In process block 110, the scanning system directs the returning beam onto the plurality of optical paths.

In optional process block 112, the returning beam is received by multiple receive paths of the plurality of receive paths. In optional process block 114, an output signal is generated by a sensor due to the returning beam received by the multiple receive paths. In optional process block 116, the subsignals included in the output signal are received with circuitry. In optional process block 118, using the circuitry, parameters of a target (e.g., distance) via the returning beam are determined based on the subsignals. In optional process block 120, the subsignals are mathematically processed to disambiguate aliasing, such that subsignals identifying apparent distances for the corresponding receive paths are mathematically altered to account for known distance correlations between the respective paths in conjunction with known Nyquist limited electronic parameters of the system in a manner that results in a final distance determination that is not limited by the Nyquist limitations of any of the subsignals.

It should be appreciated that many of the elements discussed in this specification may be implemented in a hardware circuit(s), a processor executing software code or instructions which are encoded within computer readable media accessible to the processor, or a combination of a hardware circuit(s) and a processor or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a processor or control block executing code encoded in a computer readable media, or a combination of a hardware circuit(s) and a processor and/or control block executing such code.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An optical system for use in a monostatic coherent scanning LiDAR system including (1) an electromagnetic radiation source configured to generate a waveform of electromagnetic radiation having a characteristic time scale and (2) a sensor configured to detect returning electromagnetic radiation coherently mixed with a local oscillator, the optical system comprising:
an optical element comprising a plurality of optical paths;
a single optical aperture configured to:
receive the waveform generated by the electromagnetic radiation source;
transmit the waveform as a beam of electromagnetic radiation with a characteristic beam diameter to interact with an environment;
receive a portion of the emitted beam returning after interacting with the environment at distances of interest, wherein:
the plurality of optical paths are located at specific spatial positions in a focal plane of the single optical aperture; and
the optical element is configured to relay the waveform generated by the electromagnetic radiation source to the single optical aperture;
a scanning system configured to:
direct the transmitted waveform through a range of angles into the environment at a characteristic scanning rate; and
direct the returning beam onto the plurality of optical paths, wherein:
the plurality of optical paths includes one or more receive paths;
the optical element relays the returning beam to the sensor; and
the angular scanning rate of the scanner is determined based on the characteristic beam diameter, the characteristic time scale, the specific spatial positions of the plurality of optical paths, and the distances of interest;
wherein the plurality of optical paths includes a transmit path through which the emitted waveform is transmitted to interact with the environment;
wherein the transmit path is offset in a scanning dimension from the one or more receive paths within the focal plane of the single optical aperture; and
wherein the transmit path and the one or more receive paths are all located near the focal plane of the single optical aperture.

2. The system of claim 1, wherein the transmit path comprises one of the one or more receive paths.

3. The system of claim 1, wherein:
the transmit path comprises a plurality of transmit paths;
the one or more receive paths comprises a plurality of receive paths;
the plurality of transmit paths and the plurality of receive paths are spaced apart in the focal plane of the single optical aperture to accept signals from returning beams having a plurality of different times of flight, such that a returning beam received by a particular path is correlated to a particular travel distance of the returning beam.

4. The system of claim 3, wherein a combination of the plurality of transmit paths and the plurality of receive paths are non-uniformly spaced.

5. The system of claim 3, wherein the plurality of transmit paths and the plurality of receive paths are formed by a waveguiding structure.

6. An optical sensor system for use in a monostatic coherent scanning LiDAR system including an electromagnetic radiation source configured to generate a waveform of electromagnetic radiation having a characteristic time scale, the optical sensor system comprising:
a sensor configured to detect returning electromagnetic radiation coherently mixed with a local oscillator; and
the optical system of claim 3, wherein:
the returning beam is received by multiple receive paths of the plurality of receive paths; and
an output signal is generated by the sensor due to the returning beam received by the multiple receive paths;
the output signal includes subsignals;
each of the subsignals depends on the returning beam received by a particular receive path of the plurality of optical paths.

7. The system of claim 6, further comprising circuitry configured to:
receive the subsignals included in the output signal; and
determine a distance to a target via the returning beam based on the subsignals, wherein:
each of the plurality of receive paths is associated with a distance range; and
the determined distance depends on a mathematical combination of the subsignals and the distance range of the associated receive paths that the subsignals correspond with.

8. The system of claim 7, wherein:
the subsignals each include a frequency corresponding to a distance;
the circuitry is further configured to:
mathematically process the subsignals to disambiguate aliasing, such that:
subsignals identifying apparent distances for the corresponding receive paths are mathematically altered to account for known distance correlations between the respective paths in conjunction with known Nyquist limited electronic parameters of the system in a manner that results in a final distance determination that is not limited by the Nyquist limitations of any of the subsignals.

9. The system of claim 1, further comprising circuitry configured to:
receive an output signal from the sensor, wherein:
directing the transmitted waveform through the range of angles results in a two-dimensional (2D) scan of the emitted beam across the environment;
scanning in a first dimension of the 2D scan by the scanning system is faster than scanning in a second dimension of the 2D scan by the scanning system; and the transmit path and the one or more receive paths are offset in the first dimension, the second dimension, or the first dimension and the second dimension.

10. A monostatic coherent scanning LiDAR system comprising:
an electromagnetic radiation source configured to generate a waveform of electromagnetic radiation having a characteristic time scale;
a sensor configured to detect returning electromagnetic radiation coherently mixed with a local oscillator; and
the optical system of claim 1;
wherein the local oscillator comprises a reference portion of the waveform generated by the electromagnetic radiation.

11. The system of claim 1, wherein the scanning system directing the transmitted waveform through the range of angles results in a one-dimensional (1D) scan or a two-dimensional (2D) scan.

12. A method for use in a monostatic coherent scanning LiDAR system including (1) an optical system including an optical element, a single optical aperture, and a scanning system, (2) an electromagnetic radiation source configured to generate a waveform of electromagnetic radiation having a characteristic time scale, and (3) a sensor configured to detect returning electromagnetic radiation coherently mixed with a local oscillator, the optical system comprising:
receive with the single optical aperture the waveform generated by the electromagnetic radiation source;
transmit with the single optical aperture the waveform as a beam of electromagnetic radiation with a characteristic beam diameter to interact with an environment;
receive with the single optical aperture a portion of the emitted beam returning after interacting with the environment at distances of interest, wherein:
a plurality of optical paths of the optical element are located at specific spatial positions in a focal plane of the single optical aperture; and
the waveform generated by the electromagnetic radiation source is relayed to the single optical aperture by the optical element;
direct with the scanning system the transmitted waveform through a range of angles into the environment at a characteristic scanning rate; and
direct with the scanning system the returning beam onto the plurality of optical paths, wherein:
the plurality of optical paths includes one or more receive paths;
the returning beam is relayed to the sensor by the optical element; and
the angular scanning rate of the scanner is determined based on the characteristic beam diameter, the characteristic time scale, the specific spatial positions of the plurality of optical paths, and the distances of interest;
wherein the plurality of optical paths includes a transmit path through which the emitted waveform is transmitted to interact with the environment;
wherein the transmit path is offset in a scanning dimension from the one or more receive paths within the focal plane of the single optical aperture; and
wherein the transmit path and the one or more receive paths are all located near the focal plane of the single optical aperture.

13. The method of claim 12, wherein:
the transmit path comprises a plurality of transmit paths;
the one or more receive paths comprises a plurality of receive paths;
the plurality of transmit paths and the plurality of receive paths are spaced apart in the focal plane of the single optical aperture to accept signals from returning beams having a plurality of different times of flight, such that a returning beam received by a particular path is correlated to a particular travel distance of the returning beam.

14. The method of claim 13, further comprising:
receiving the returning beam by multiple receive paths of the plurality of receive paths; and
generating an output signal by a sensor due to the returning beam received by the multiple receive paths, wherein:
the sensor is configured to detect returning electromagnetic radiation coherently mixed with a local oscillator;
the output signal includes subsignals; and
each of the subsignals depends on the returning beam received by a particular receive path of the plurality of optical paths.

15. The method of claim 14, further comprising:
receiving the subsignals included in the output signal with circuitry; and
determining using the circuitry a distance to a target via the returning beam based on the subsignals, wherein:
each of the plurality of receive paths is associated with a distance range; and
the determined distance depends on a mathematical combination of the subsignals and the distance range of the associated receive paths that the subsignals correspond with.

16. The method of claim 15:
wherein the subsignals each include a frequency corresponding to a distance;
further comprising mathematically processing the subsignals to disambiguate aliasing, such that:
subsignals identifying apparent distances for the corresponding receive paths are mathematically altered to account for known distance correlations between the respective paths in conjunction with known Nyquist limited electronic parameters of the system in a manner that results in a final distance determination that is not limited by the Nyquist limitations of any of the subsignals.

17. The method of claim 12, further comprising:
receiving with circuitry an output signal from the sensor, wherein:
directing the transmitted waveform through the range of angles results in a two-dimensional (2D) scan of the emitted beam across the environment;
scanning in a first dimension of the 2D scan by the scanning system is faster than scanning in a second dimension of the 2D scan by the scanning system; and
the transmit path and the one or more receive paths are offset in the first dimension, the second dimension, or the first dimension and the second dimension.

18. The method of claim 12, further comprising:
detecting with a sensor returning electromagnetic radiation coherently mixed with a local oscillator, wherein the local oscillator comprises a reference portion of the waveform generated by the electromagnetic radiation.

19. The method of claim 12, wherein directing the transmitted waveform through the range of angles results in a one-dimensional (1D) scan or a two-dimensional (2D) scan.

* * * * *